United States Patent
Goldman

(10) Patent No.: US 11,828,628 B2
(45) Date of Patent: Nov. 28, 2023

(54) POSITION SENSING APPARATUS WITH REMOTE ELECTRONICS FOR HARSH ENVIRONMENTS

(71) Applicant: LRT Sensors LLC, Narberth, PA (US)

(72) Inventor: Leonard Goldman, Bala Cynwyd, PA (US)

(73) Assignee: LRT Sensors LLC, Philadelphia, PA (US)

( * ) Notice: Subject to any disclaimer, the term of this patent is extended or adjusted under 35 U.S.C. 154(b) by 87 days.

(21) Appl. No.: 17/616,608

(22) PCT Filed: May 15, 2020

(86) PCT No.: PCT/US2020/033164
§ 371 (c)(1),
(2) Date: Dec. 3, 2021

(87) PCT Pub. No.: WO2020/247167
PCT Pub. Date: Dec. 10, 2020

(65) Prior Publication Data
US 2022/0228888 A1 Jul. 21, 2022

Related U.S. Application Data

(60) Provisional application No. 62/856,886, filed on Jun. 4, 2019.

(51) Int. Cl.
*G01D 5/22* (2006.01)
*G01D 5/248* (2006.01)
*G01D 5/24* (2006.01)

(52) U.S. Cl.
CPC ............ *G01D 5/2225* (2013.01); *G01D 5/24* (2013.01); *G01D 5/248* (2013.01)

(58) Field of Classification Search
CPC .... G01D 5/202; G01D 5/2225; G01D 5/2291; G01D 5/24; G01D 5/248; G01D 3/028; G01D 3/036
See application file for complete search history.

(56) References Cited

U.S. PATENT DOCUMENTS

| 3,140,608 | A | * | 7/1964 | Clark | .................... | G01F 23/263 |
| | | | | | | 340/870.37 |
| 3,756,081 | A | * | 9/1973 | Young | .................... | G01D 5/202 |
| | | | | | | 324/207.16 |

(Continued)

OTHER PUBLICATIONS

International Search Report dated Aug. 12, 2020 received in PCT Application No. PCT/US2020/033164 filed May 15, 2020.

(Continued)

*Primary Examiner* — Steven L Yeninas
(74) *Attorney, Agent, or Firm* — Stradley Ronon Stevens & Young, LLP

(57) ABSTRACT

A sensing apparatus for use in harsh environments to measure a target characteristic. The apparatus has a sensing element formed as a section of a coupled slow-wave structure including at least two impedance conductors each curled into a helix with opposing directions of winding around a dielectric base to form a resonator. The sensing element provides as an output signal a digital frequency that depends on the value of the measured characteristic. A target tube moves over the sensing element, covering and uncovering portions of the sensing element. An electronics module receives the output signal and displays the measured characteristic. A separate coaxial cable is connected to each impedance conductor on one end and to the electronics module on the other end, with the length of the coaxial cables separating the electronics module from the sensing element by a distance sufficient to avoid exposing the electronics module to the harsh environments.

19 Claims, 15 Drawing Sheets

(56) References Cited

U.S. PATENT DOCUMENTS

| | | | | |
|---|---|---|---|---|
| 3,891,918 A * | 6/1975 | Ellis | | G01D 5/202 |
| | | | | 324/207.16 |
| 3,997,835 A * | 12/1976 | Ando | | G01B 7/023 |
| | | | | 324/207.26 |
| 4,232,300 A * | 11/1980 | Wright | | G01F 23/241 |
| | | | | 73/304 C |
| 4,324,255 A * | 4/1982 | Barach | | G01R 15/148 |
| | | | | 600/300 |
| 4,737,705 A | 4/1988 | Bitar et al. | | |
| 6,191,575 B1 | 2/2001 | Mednikov et al. | | |
| 6,293,142 B1 | 9/2001 | Pchelnikov et al. | | |
| 6,393,912 B2 | 5/2002 | Pchelnikov et al. | | |
| 6,819,208 B1 | 11/2004 | Peghaire et al. | | |
| 7,092,840 B2 * | 8/2006 | Gualtieri | | G01D 5/48 |
| | | | | 324/633 |
| 7,216,054 B1 | 5/2007 | Pchelnikov et al. | | |
| 7,656,167 B1 | 2/2010 | McLean | | |
| 8,692,541 B2 * | 4/2014 | Nyce | | G01D 5/2291 |
| | | | | 324/207.16 |
| 9,995,778 B1 * | 6/2018 | Fiori, Jr. | | G01R 27/2611 |
| 10,856,452 B1 * | 12/2020 | Fiori, Jr. | | G01D 5/202 |
| 2003/0019291 A1 * | 1/2003 | Pchelnikov | | G01F 23/284 |
| | | | | 73/290 V |
| 2003/0025573 A1 * | 2/2003 | Pchelnikov | | H01P 9/02 |
| | | | | 333/161 |
| 2007/0088527 A1 | 4/2007 | Pchelnikov et al. | | |
| 2013/0088243 A1 | 4/2013 | Nyce et al. | | |
| 2017/0030215 A1 * | 2/2017 | Kulczyk | | G01D 5/2013 |

OTHER PUBLICATIONS

Goldman, "A New Linear Non-Contact Position Sensor for Harsh Environments", LRT Sensors LLC, 2012, https://lrtsensors.com/wp-content/uploads/2012/09/White-Paper-DIST-Comparison-with-sim-tech-r2.pdf.

\* cited by examiner

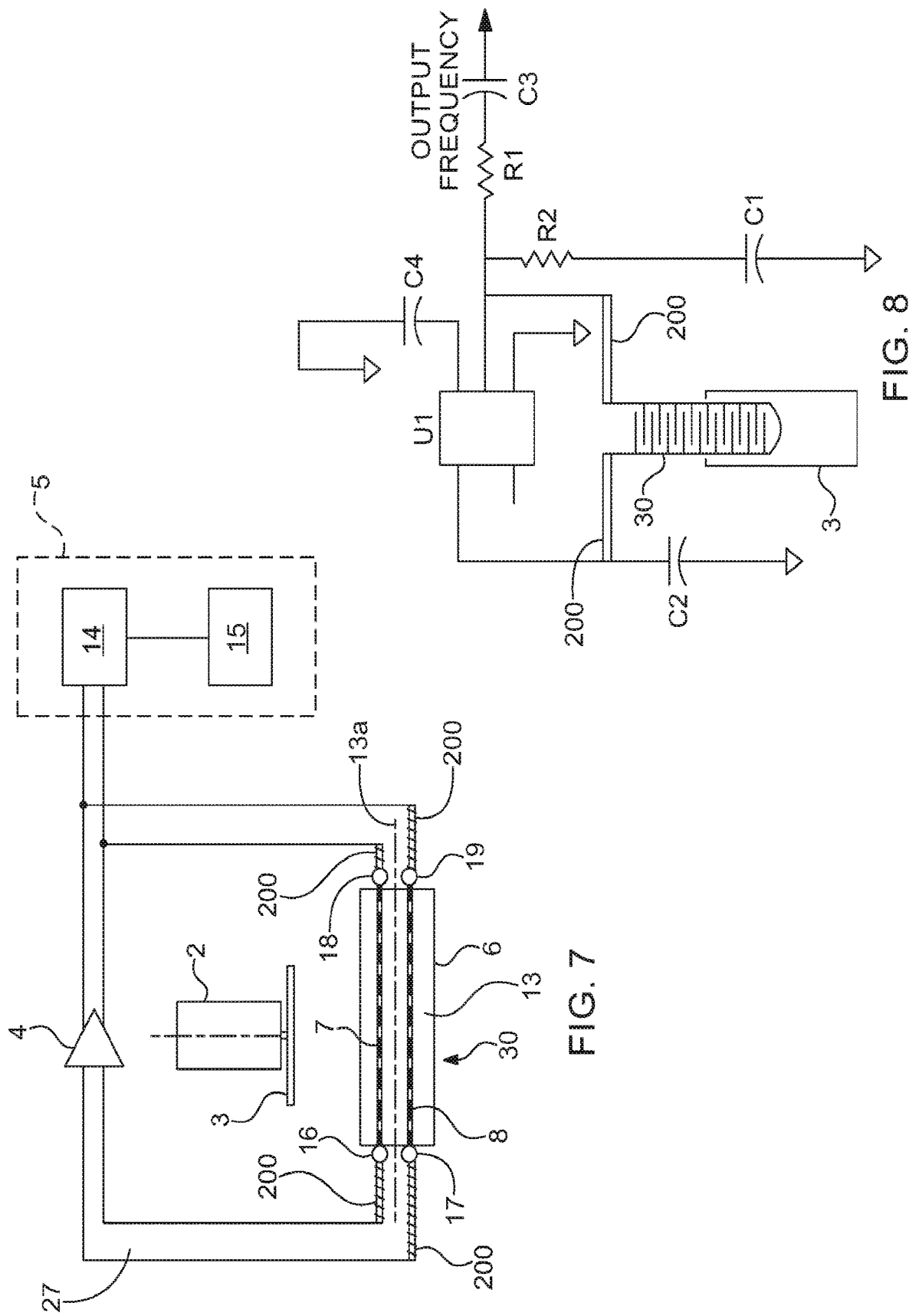

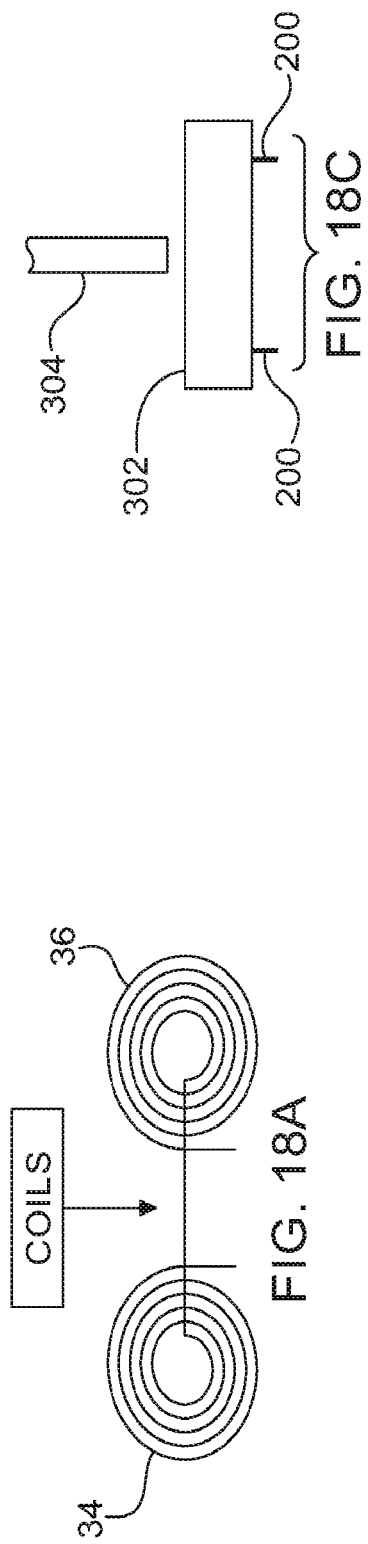

POSITION SENSING APPARATUS WITH REMOTE ELECTRONICS FOR HARSH ENVIRONMENTS

RELATED APPLICATION

This application is a national phase filing of International Patent Application No. PCT/US2020/033164, filed on May 15, 2020 which claims the benefit of priority of U.S. Provisional Patent Application No. 62/856,886 filed on Jun. 4, 2019, the contents of which are incorporated in this application by reference.

TECHNICAL FIELD

The present invention relates generally to sensors that use a sensing element and electronic circuits in performing a sensing function to measure the value of a physical parameter, such as linear position, rotary position, gaps, or liquid levels, and that provide an electrical output indicative of the value of the measured parameter. More particularly, the present invention relates to sensors that can operate in harsh environmental conditions.

BACKGROUND OF THE INVENTION

The usefulness of an RF (radio frequency) or microwave electromagnetic field for the purpose of linear position measurement is known. When an electromagnetic field is excited near a movable object, the parameters of the electromagnetic field, such as resonant frequency, phase, or amplitude, vary with the change of position of the movable object. The electromagnetic field parameters may be converted into an electronic indication of position, displacement, velocity, or acceleration of the movable object. In particular, U.S. Pat. No. 6,819,208 discloses a ferromagnetic actuator with a ferromagnetic circuit defining an axial travel interval of a ferromagnetic armature for axially driving a rod between two extreme positions in which the armature bears against poles of the ferromagnetic circuit. A resilient return is provided to hold a valve at rest in a middle position between the extreme positions, and at least one coil is carried by the circuit, enabling the armature to be brought alternately into each of the two extreme positions. The rod carries a radially magnetized bar of a length not less than the travel distance of the armature, and the housing carries at least one magnetic flux sensor placed in a zone having low exposure to the field created by the coil or coils.

The application of slow-wave structures is also known for measuring liquid level and angular position. See U.S. Pat. Nos. 6,293,142 and 6,393,912. These patents teach the significant decrease of physical dimensions and resonant frequency of a sensing element. In these patents, a sensing element, fabricated as a section of a slow-wave structure (SWS), is connected to a measuring circuit comprising an RF oscillator and a converter which converts the resonant frequency of the sensing element SWS into a level reading, in the first example, or to an angular position reading, in the second example.

The use of a SWS sensing element enables the control of electric and magnetic field distribution in the transverse and in the longitudinal directions. The use of coupled slow-wave structures makes it possible to split the electric and magnetic fields in the transverse direction. Splitting of the electric and magnetic fields can provide additional slowing of the electromagnetic wave. Splitting them in the transverse direction can also enhance the dependence of the electromagnetic field parameters on the distance between the slow-wave structure and a conductive target.

Slow waves are electromagnetic waves propagating in one direction with a phase velocity $V_p$ that is smaller than the velocity of light, c, in a vacuum. The ratio $c/V_p$ is called the deceleration factor or slowing factor. It is designated as N. In most practical applications, slowed electromagnetic waves are formed in slow-wave structures by coiling one or two conductors, for example, into a helix or radial spiral, which geometrically increases the path length traveled by the wave. Such a curled conductor is called an "impedance conductor." It is commonly paired with another conductor that is not curled, called a "screen conductor."

Additional deceleration, in addition to the geometric path length, can also be obtained by positive electric and magnetic coupling in a coupled slow-wave structure. In this case, both conductors are coiled, and have the configuration of mirror images flipped by 180 degrees relative to a plane of symmetry.

Slow-wave structure-based sensor elements are known. Slowing of an electromagnetic wave leads to a reduction in the dimensions of a sensing element for a given resonant frequency. Thus, by using the advantages of electrodynamic structures, a relatively small sensing element can operate at relatively low frequencies. A lower operating frequency is more convenient to generate, and more convenient for the conversion circuit which produces a desired output signal. An operating frequency can be chosen so that it is low enough to provide the above advantages, but still high enough to provide high accuracy and a high speed of response.

The low electromagnetic losses at relatively low frequencies (a few megahertz (MHz) to tens of MHz) also helps to increase the accuracy and sensitivity of the measurement. In addition, slowing of the electromagnetic wave leads to concentration of the energy in both the transverse and longitudinal directions. This results in an increase in sensitivity, proportional to the slowing factor.

Known devices can measure one or more parameters of an electromagnetic field. Some of the devices use one or two resonators, placed near a movable object for which the position is to be measured. Changes in the position of the movable object result in changes of the electromagnetic parameters of the resonator or resonators. The resonator or resonators is or are connected to a measuring circuit comprising an RF or microwave signal generator, which is used to excite an electromagnetic field.

In practice, four different types of sensors are known for measuring, among other parameters, linear or rotary position, gaps, and liquid levels. These sensors are linear variable differential transformer (LVDT) sensors, linear variable inductive transducer (LVIT) sensors, magnetostrictive sensors, and sensors based on distributed impedance sensor technology (DIST). Sensors can sometimes be physically partitioned into a sensing part and a signal conditioning part, so that the sensing part can be exposed to a higher or lower temperature (or sometimes, to nuclear radiation) and the signal conditioning part can remain at a benign temperature (or at a lower radiation level). Each of the four sensor types are summarized below.

An LVDT sensor is a non-contact inductive sensor that has been in use for decades. (The first potential LVDT was designed and built by Michael Faraday in 1831 as part of his work on the development of the electric motor. It is still on display. Practical versions became common during World War II.) It is a variable transformer with a movable magnetic core. The LVDT sensor has three wound coils: one primary and two secondary coils. A carefully calibrated AC voltage is injected into the primary coil and then transferred to the secondary coils via the coupling of the magnetic core, which is usually a soft iron rod. As the position of the core changes, the output voltages in the secondary coils change thus producing a measure of the position of the core. A dedicated electronic module (a signal processor) provides the input signal, measures the output signal, and provides a linear output after correcting for attenuations and phase changes in the wires. This electronic module can be located remotely from the coil, allowing the LVDT coil to operate in a harsh environment while the signal conditioner can be placed in a more benign location.

An LVDT sensor requires three to six power and signal wires between the coil and the signal analyzer, however, and the connecting wires carry sinusoidal and quadrature sinusoidal waveforms at kilohertz (kHz) frequencies, and sometimes at relatively low voltage levels, while the amplitude of the voltage, as well as the phase, represents the signal. Therefore, the connections must be made using a shielded cable, to prevent interference from external magnetic fields, and must be used with a signal conditioner that is designed for that type of LVDT sensor and that is calibrated for exactly that particular LVDT sensor. An LVDT sensor also requires a dedicated signal processor for calibration. If the signal processor is replaced, the sensor must be recalibrated. Because the output signal from an LVDT sensor is analog, system noise inevitably limits its ultimate resolution.

An LVIT sensor typically consists of a single coil of wire with a moveable permeable core. The inductance of such a device varies as the core is moved in and out of the coil. If the coil is connected to an oscillator and driven below the resonant frequency of the circuit, the output voltage will vary with the movement of the core by using a simple circuit. The resonance frequency is set by the capacitance and inductance of the circuit. A related configuration uses a second coil with a permanent core and measures the ratio of the output of the two coils which will also vary with moveable core position. This configuration is similar to an LVDT sensor, but currently requires the electronics to be close to the coils. The main advantages of the LVIT sensor are that its stroke-to-length is shorter than an LVDT sensor and that it is simpler to manufacture.

Magnetostrictive sensors consist of a wire (the waveguide) that extends over the length of the measurement range. A permanent ring magnet, the position magnet, surrounds the wire and is attached to whatever is moving. The wire is selected so that when an electrical interrogation pulse is applied to the wire, an ultrasonic strainwave is generated at the location of the position magnet. The time elapsed between generation of the strainwave and its detection at one end of the waveguide is indicative of the measured position. This sensor can be very long (meters) but has a slow response time due to the large transit times of acoustic pulses. The magnetostrictive sensor has one advantage over other sensors in that its resolution is 1 to 2 microns, independent of the length of the sensor. Such sensors do have environmental limitations in regard to temperature, shock and vibration, however, and their upper-temperature limit is only 100° C. This temperature limitation is due to characteristics of the sensing element and not the electronics of the signal processor which is attached. The heart of the magnetostrictive sensor, the waveguide, is also susceptible to failure when used in high-shock and vibration applications. In some situations where space near the measurement point is limited, the signal processor can be located remotely. Given the high power requirements of the interrogation pulse and the weakness of the return signal, however, the distance between the processor and sensing element is limited to a few centimeters and must be carefully shielded. As with the LVDT sensor, the magnetostrictive sensor and signal processor must be calibrated as a unit and replacement of the signal processor requires recalibration.

The sensing head of a magnetostrictive sensor can be separated from the conditioning electronics by a very short cable having wires for the interrogation pulse and wires for the received signal pulse. But the interrogation wires must carry voltage and current in the range of more than ten volts and more than one ampere, while the signal wires carry a signal in the millivolt and micro amp range. This places limitations on the length (a few centimeters) and type of cable (individually shielded pairs) and requires a specialized electronics module that is designed for the type of sensing element and that is calibrated for exactly that particular magnetostrictive sensor.

Like many conventional sensors, LVDT sensors, LVIT sensors, and magnetostrictive sensors include magnetic materials, such as iron and nickel, and permanent magnets, which are sometimes not compatible with requirements of a specific application. An LVDT sensor uses a core made from a ferromagnetic material (usually a nickel-iron alloy), and magnetostrictive position sensors use a position magnet which is a permanent magnet, often a rare-earth magnet.

LVDT sensors, LVIT sensors, and magnetostrictive sensors typically use a sensing element and an electronics module. The electronics module powers the sensing element, conditions the signal provided from the sensing element, and provides a desired output signal. The signal conditioning part of the electronics module is designed specifically to provide the type of power required, and to receive the type of signal delivered, by the sensing element. The included analog and/or digital circuits for powering and signal conditioning are generally somewhat complex, and the required specialized components are difficult or impossible to find on the market with maximum temperature capability of more than 125° C.

U.S. Pat. No. 7,216,054 describes sensors based on DIST. The DIST sensor consists of a double coil wound on a round non-conductive rod (usually fiberglass). The wire is wound as a helix with a large pitch. Upon reaching the end of the shaft, the pitch is reversed and a returning helix is laid over the first coil. In the electronics section, a simple circuit consisting of a single transistor is connected to the ends of the coil, producing a resonant circuit that oscillates in the 2-4 MHz region. The result is two coils in series with one having current flowing clockwise and the other counterclockwise. The magnetic fields of these two coils are parallel to the sensor, point in opposite directions, and cancel each other by the "right hand rule." At the same time the electric fields from these circulating currents are perpendicular to the rod and again by the "right hand rule" they are additive. The resulting electromagnetic field outside the coil is then mostly electric with a minimal magnetic component.

The frequency of this circuit is determined by the inductance (L) and capacitance (C) of the coil. Operating a circuit at its resonance frequency produces a very stable output (assuming that L and C remain constant). The inductance of the DIST design is low and constant, due to the few turns of the coil, but the ratio of capacitance to inductance is higher than in an inductive sensor and is based on the interaction of the strong electric field of the sensor with any nearby conductive surface. If a conductive surface begins to cover the coil, the capacitance and resonant frequency of the sensing element change dramatically. Changes on the order of about one MHZ in resonant frequency can be observed when the conductive surface moves the full length of the sensor. The change in frequency is linear with the movement of the conductive surface, can be transmitted great distances with no loss of information, and is easily converted to a digital signal for further processing.

The output of the DIST sensor, as discussed above, is from a stable resonance circuit whose frequency is determined by the capacitance changes of the moving conductive surface. A typical sensor will have almost a one MHz change in frequency over the full range of motion. Because frequency can easily be measured to better than one part in one million, this translates to a reproducibility (and accuracy after mapping) of better than one micron over sensor lengths up to one meter. The resolution of the sensor is sub-micron and is determined more by the quality of the frequency meter than the sensor itself.

In the DIST sensor there is no need to use extremely fine wire as with an LVDT sensor. Wire diameter is intentionally minimized in an LVDT sensor to produce a large inductance and a negligible capacitance, both LVDT characteristics. In contrast, a DIST sensor can use a much heavier, flattened wire because the goal is to maximize capacitance. A more robust wire becomes practical and is in fact advantageous. The heavier wire wound on a flexible rod can withstand extremely high levels of shock and vibration and overcomes these susceptibilities of other sensors.

Having an output that is a digital frequency rather than a voltage has many advantages. The amplitude of a frequency signal in the DIST system is not significant so long as it remains above the threshold of detection. The resistance of any metal wire changes with temperature which translates to amplitude changes of any analog signal being sent through that wire. The frequency of the resonant circuit is not affected, however, by the change in resistance of the wire. Typical inductive sensors have analog outputs which make them susceptible to not only temperature changes but noise, attenuations, and other distortions. They require that the system electronics be near to the sensor or have extensive correction software to compensate for these errors. Because of these and other problems, it is difficult for an analog sensor to have accuracies better than one part in one thousand (0.1%) of full scale. As discussed above, the DIST sensor accuracy is potentially one part in one million (0.0001%) of full scale. The frequency signal can be replicated and sent over separate wires for redundancy or multiplexed giving it great flexibility in its mode of transmission. In addition, because the signal analyzer is nothing more than a frequency counter, the DIST sensor does not lose its calibration if it becomes necessary to change the electronics in the signal analysis portion.

The electronic section of the DIST sensor requires only a single active device (an inverter) which is available up to 150° C. (and for short time periods up to 225° C.) and high radiation versions. The output frequency can be piggy-backed on the DC power so that only one wire is required and the receiver can be located remotely. All of this circuitry (along with an optional temperature sensor) easily fits on a very small circuit board. This configuration gives the DIST sensor the ability to operate in harsh environments with only a single wire (plus a ground) to transmit information to a remote computer. In addition, the ability to have a signal wire in excess of 10 meters in length, and longer with repeaters, allows great flexibility in locating the signal analysis electronics. In many applications, a frequency meter is already in place and can make the measurement without additional complexity.

The single signal wire output from the one-wire DIST sensor is also very beneficial when operating in a high-pressure environment. Conductor transitions from high to low pressure are expensive, vulnerable (usually glass seals), and could cause distortion of analog signals.

The DIST sensor uses a single dual-helix coil (not a ratio of coils as in the LVDT sensor) that is sensitive to temperature changes. This is because the temperature variation is due to electronic drift and the expansion and contraction of the coil and the target tube. To compensate for this change, the DIST sensor can have an integral temperature sensor to accommodate corrections. The temperature variations in the DIST sensor can also be minimized by using low coefficient of expansion materials such as ceramics and quartz for the coil and Al-Nicol metal for the target tube.

The DIST sensor, having its signals multiplexed onto the single wire output, requires a simple passive filter network at the receiving end so as to direct the signals to their respective frequency meters. In applications that do not require operation in hazardous conditions and/or have no space limitation, the conversion of the frequency to standard outputs can be performed in an electronics module attached to the sensor. This eliminates the need for external filter networks but limits operation to temperatures below 125° C. and increases the size of the electronics package.

U.S. Pat. No. 8,692,541 teaches a sensing head having several improvements to the electromagnetic-type position sensor that has a sensing element configured as a section of a coupled slow-wave structure, used as a resonator, and coupled with an electrically conductive movable target, such as that disclosed in the '054 patent. Accordingly, the term "sensing element" is descriptive of the purpose of such a device, while the term "resonator" is descriptive of its electrical function, and therefore these two terms are sometimes used interchangeably in this document. More specifically, the '541 patent teaches three improvements over the DIST sensor disclosed in the '054 patent.

First, the sensing head is formed of a sensing element and a simplified electronics module, the simplified electronics module including a resonant oscillator. A resonant oscillator is an oscillator having a frequency controllable by a resonator that is connected to it. Accordingly, the terms "oscillator" and "resonant oscillator" are sometimes used interchangeably in this document. The sensing element is thereby separated from the complex electronic circuitry that would otherwise be needed to provide an output that is a standard type for a sensor. Electronic circuits, except for a very simple resonant oscillator circuit co-located with the sensing element, are removed, and the sensing head has a variable frequency output signal instead. The combination of the sensing element and the resonant oscillator circuit, mounted into a much smaller housing, is called the sensing head. The simplicity of the resonant circuit allows high-temperature operation, because the simple components used can be found on the market with operating temperatures of 225° C. or more. (Most electronic components operate effectively up to 125° C. As the environmental temperature increases, however, the number and complexity of devices able to operate drop rapidly while the cost and size increase dramatically. By 225° C., only passive devices and very simple electronic components such as operational amplifiers are available and they have limited lifetimes measured in hours. Similar but not as severe problems face operations at lower temperatures such as −60° C.) The amplitude of the variable frequency output is not indicative of the signal, and so there is no degradation of the accuracy of the signal, even with a separation distance of more than 10 meters between the sensing head and a receiving device. Use of the simple resonant oscillator circuit in the sensor head, rather than the use of normal signal conditioning electronics, allows the simplified electronics module to be very small. As a result, the usual diameter of about 4.8 centimeters for a conventional position sensor having a single circuit board can be reduced to less than 2.0 centimeters, still having a single circuit board. Use of the simplified electronics module also enables the sourcing of components that can operate in environments of higher levels of ionizing radiation.

The second improvement addresses high reliability applications. In such applications, multiple identical sensors have often been deployed to make one measurement. With two sensors (a dual-redundant system), as long as the two sensors agree, then the data are expected to be accurate. If the two sensors report different readings, however, then the data from both sensors are suspect and should not be relied upon. With three sensors (a triple-redundant system), as long as at least two of the sensors agree, then the system can continue to operate with this value until a convenient time for service and replacement of the one sensor that disagrees. Dual and triple-redundant sensor systems have been deployed by installing two or three separate sensors, and then mechanically coupling each of them to the same movable object, so that they each measure the position of the movable object. This mechanical coupling introduces errors due to differences in alignment, free-play, and other imperfect attributes of the mechanical couplings.

The sensing element of the sensing head taught by the '541 patent addresses high reliability applications. The sensing element is constructed so that up to three active elements (i.e., resonators) can be located within the same physical space as a single sensor. For a dual sensing head, the two parts (resonators) of the sensing element can be positioned coaxially, or linearly, with respect to one another. For a triple sensing head, two resonators of the sensing element are positioned linearly, and the third resonator is mounted coaxially. In both cases, they all measure the position of the same movable object.

Finally, the sensing head taught by the '541 patent is connected with receiving or conditioning equipment by only one wire, in addition to the usual chassis ground, common, or shield. The power and signal are both communicated over the one wire. The signal is a variable frequency that is impressed onto the one wire. The amplitude of the signal frequency is not important, as long as the signal is detectable. The position or the position and a temperature, or two positions, or two positions and a temperature, etc. can be impressed onto the one wire at the same time by frequency division multiplexing (FDM). Each of the signals to be impressed by FDM has its own individual frequency range of operation, so the multiple FDM signals can be separated again as needed, by filtering over the respective frequency ranges. A demodulator circuit is also taught, as an example for separation of the FDM signals at the receiving end of a sensor system.

With only the sensing function contained within the sensing head, the external circuitry that is used for signal conditioning and/or analysis can be made with a standardized calibration setting. Therefore, the signal conditioning and/or analysis equipment can be changed if desired, without affecting the calibration of the sensor.

Known devices exhibit several problems. Some of the devices have low accuracy, sensitivity, and resolution at relatively low frequency, increasing only with a substantial increase in the operating frequency. An increase in frequency is accompanied, however, by an increase in electromagnetic losses, such losses limiting the accuracy of the measurement. It is also generally known that a higher operating frequency can increase the cost of the associated electronic circuitry. Some known devices therefore require complex and expensive equipment. Thus, there is a need in the art for an electromagnetic method and apparatus for monitoring position that has greater sensitivity, resolution, and lower cost.

To overcome the shortcomings of known devices, a new sensing apparatus is provided. An object of the present invention is to provide an improved apparatus that is relatively simple, economical, and compact and that can make accurate and reliable measurements of a target object. Such measurements can include, for example, linear distance, radial or rotary motion, proximity, and liquid levels. A related object is to avoid the need for compensation or complex circuitry to achieve accurate measurements. Another object is to provide an apparatus that can be made redundant in a simple and reliable manner.

It is still another object of the present invention to provide an improved apparatus that can make accurate and reliable measurements in almost any environment. Such environments can include, for example, high and low temperatures, high radiation levels, high pressure, vibration or shock, and caustic chemicals or steam. An additional object is to provide an improved apparatus that is intrinsically safe.

BRIEF SUMMARY OF THE INVENTION

To achieve these and other objects, and in view of its purposes, the present invention provides an improved sensing apparatus. The sensing apparatus functions even in harsh environments to measure a characteristic of an electrically conductive target. The apparatus has a sensing element formed as a section of a coupled slow-wave structure including at least two impedance conductors each curled into a helix or spiral with opposing directions of winding around a dielectric base to form a resonator. The sensing element is connected by two coaxial cables to a remote electronics module which includes electronic components to create a resonant circuit with the sensing element. A target tube is formed of an electrically conductive material and configured to move over the sensing element, covering and uncovering portions of the sensing element. This will cause the frequency of the resonant circuit to change proportionally to the movement of the target tube. The length of the coaxial cables separates the electronics module from the sensing element by a distance sufficient to avoid exposing the electronics module to the harsh environments.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 7 shows an embodiment of the sensing element operating with a variable frequency according to the present invention;

FIG. 8 is a circuit diagram of another electronics module of the present invention;

FIG. 18A illustrates the helices of a modified sensor useful to measure the gap of each turbine blade tip of a jet engine as it passes the sensor during operation of the jet engine;

FIG. 18B illustrates the helices shown in FIG. 18A as folded over each other and imbedded into a ceramic body; and FIG. 18C is a side view of the modified sensor as located in the cowling wall with the turbine blade above the sensor and two coaxial cables leading from the coils and extending out from the ceramic body.

DETAILED DESCRIPTION OF THE INVENTION

In a manner similar to inductive sensors, the sensor according to this disclosure follows the fundamental laws of physics concerning changing electromagnetic fields. An electromagnetic wave will travel forever at the speed of light in a straight line with no energy loss in a perfect vacuum. If the electromagnetic wave encounters any material, however, the energy and the direction of the electromagnetic wave will be changed. The amount of the change can, in theory, be calculated by a set of well-known equations called Maxwell's equations. A position sensor determines the change in the wave and from that can be used to calculate the presence and position of an object in the path of the wave. Therefore, if an object moves into the path of the electromagnetic wave, the wave will be distorted in a predictable manner. If this distortion is measured, it is possible to determine the motion and position of the object in the path of the wave, i.e., a position sensor.

Figure 1:
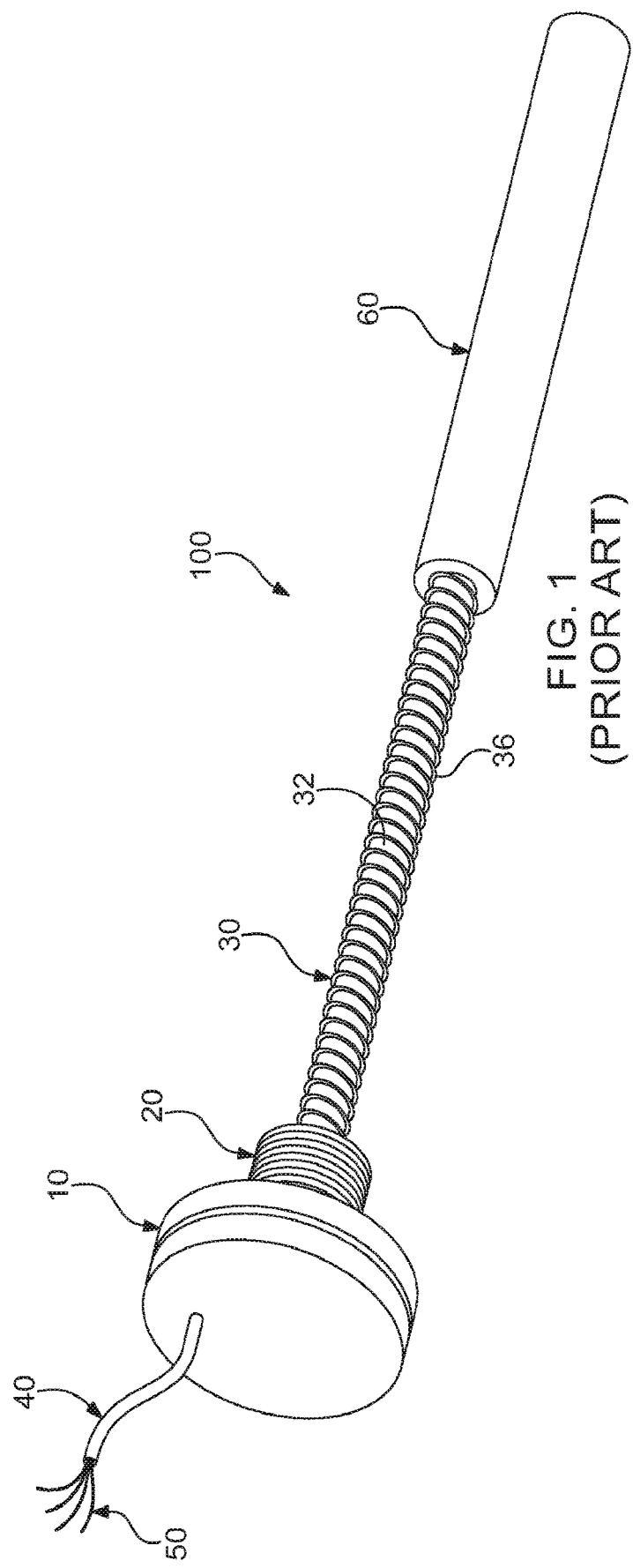
FIG. 1 shows an electromagnetic linear position sensor in accordance with U.S. Pat. No. 7,216,054.
Figure 2:
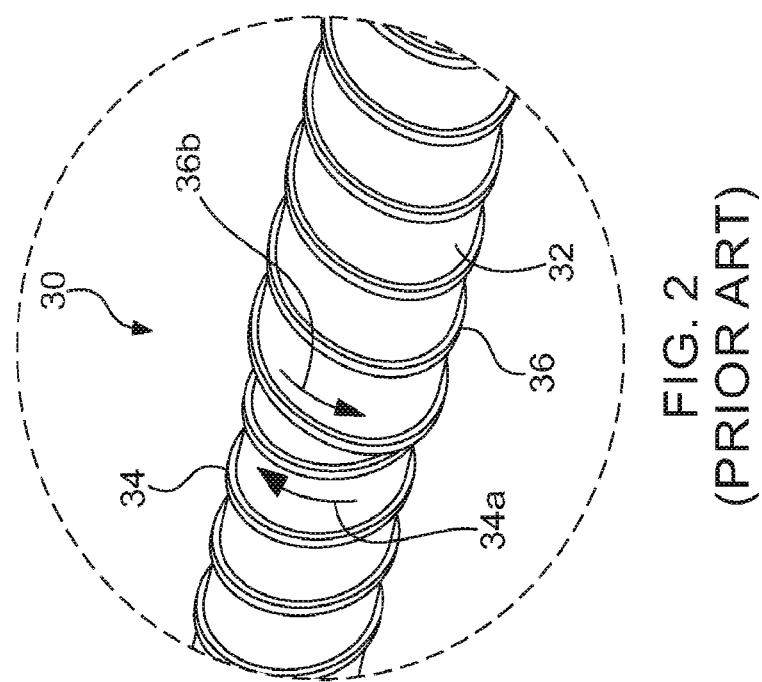
FIG. 2 highlights the sensing element of the sensor shown in FIG. 1.

Referring now to the drawing, in which like reference numbers refer to like elements throughout the various figures that comprise the drawing, FIG. 1 shows an electromagnetic linear position sensor 100 in accordance with U.S. Pat. No. 7,216,054. The sensor 100 has a housing 10 that encloses an electronics module (not shown). The electronics module is usually manufactured as a printed circuit board having electronic components mounted to its surfaces. A threaded area 20 provides structure for mounting the position sensor 100 into a desired location. A sensing element 30 is constructed of an electrically insulated rod 32 onto which are wound an inner helix 34 and an outer helix 36 of electrically conductive material. Although only the outer helix 36 can be seen in FIG. 1, FIG. 2 illustrates the rod 32 and both helices 34, 36 that form the sensing element 30. The inner helix 34 is wound onto the electrically insulated rod 32 in the direction of arrow 34A; the outer helix 36, in the direction of arrow 36B.

The two helices 34, 36 are arranged along the electrically insulated rod 32 at a pitch, with a separating material to electrically insulate one helix 34 from the other helix 36. The electrodynamic element thus formed is a part of a slow-wave structure. A cable 40 brings out electrical connections from the electronics module that is within the housing 10, and contains, for example, four connection wires 50. In the example of four connection wires, they can be power, common, output voltage or current, and calibration port. A target tube 60 is formed of an electrically conductive material, such as an aluminum alloy, and is moveable over the sensing element 30. As the target tube 60 moves toward the threaded area 20, the target tube 60 covers up more and more of the length of the sensing element 30. For example, the target tube 60 is shown in FIG. 1 at zero percent coverage of the sensing element 30, and will cover the sensing element 30 by 100% when the target tube 60 moves to be adjacent to the threaded area 20. This movable range of 0 to 100% is the measuring range of the position sensor 100.

As summarized above, U.S. Pat. No. 8,692,541 offers several improvements to the sensor 100 initially disclosed in U.S. Pat. No. 7,216,054. One improvement is that the housing 10 is smaller and encloses a simplified electronics module. Another improvement is that a pair of wires replace the cable 40 and connection wires 50 for electrical connections that will provide power and support signal transmission. One wire of the pair is the power wire; the other conductor is a power return conductive path, such as circuit common or case connection. The power return or case connection is not required to be a separate wire, but may be connected directly through contact with the housing 10.

Regardless of which electronics module and electrical connections are used, the helices 34, 36 of the sensing element 30 must be coupled with the electronics module in order for the sensor 100 to operate as a position sensor. The known sensor 100 places the electronics module in the housing 10 which is located proximate the sensing element 30—as shown in FIG. 1—and thereby allows direct connection of the helices 34, 36 to the electronics module and avoids the need for further wires to couple the helices 34, 36 to the electronics module. If ordinary wires of any significant length are used for this coupling purpose, they would become part of the coil and would distort the signal.

The problem with locating the housing 10 (and the enclosed electronics module) proximate the sensing element 30 is that the electronics module must withstand the same environment as the sensing element 30. It would be desirable to use the sensing element 30 in harsh environments, whether those harsh environments be high temperature (e.g., in excess of 125° C.), low temperature (e.g., below −60° C.), high radiation, high pressure, caustic chemicals, vibration, shock, steam, or another adverse condition. It might be possible to include specialized electronic components on the electronics module able to perform under some adverse environmental conditions, but such specialized electronic components would increase the size, cost, and complexity of the sensor 100, and would have limited performance and lifetimes in the harshest environmental conditions. In addition, temperature and other sensors would be needed to correct for the changes in signal due to these harsh conditions.

Figure 3:
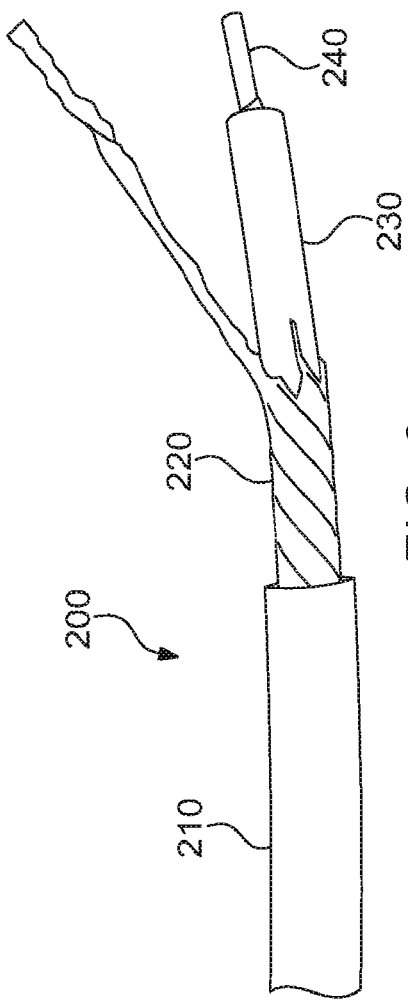
FIG. 3 illustrates the coaxial cable included as one component of the improved sensor according to the present invention.

A solution to that problem is provided by the inclusion of a readily available, low-capacitance coaxial cable 200 in the sensor 100. As shown in FIG. 3, the coaxial cable 200 has an outer plastic sheath 210, a woven copper shield 220, an inner dielectric insulator 230, and a copper core 240. The coaxial cable 200 is a type of electrical cable that has an inner conductor (e.g., the copper core 240) surrounded by a tubular insulating layer (e.g., the inner dielectric insulator 230), surrounded by a tubular conducting shield (e.g., the woven copper shield 220). Many coaxial cables, like the example shown, also have an insulating outer sheath or jacket such as the outer plastic sheath 210. The term "coaxial" comes from the inner conductor and the outer shield sharing a geometric axis. Coaxial cable was invented by English physicist, engineer, and mathematician Oliver Heaviside, who patented the design in 1880. The coaxial cable 200 is a type of transmission line, used to carry high frequency electrical signals with low losses. The coaxial cable 200 differs from other shielded cables because the dimensions of the cable and connectors are controlled to give a precise, constant conductor spacing, which is needed for it to function efficiently as a transmission line.

One coaxial cable 200 is connected to each one of the helices 34, 36; therefore, two coaxial cables 200 are included with the sensor 100. The ends of the coaxial cables 200 opposite the ends that are connected to the helices 34, 36 are connected to the electronic components on the electronics module. The electronics module is thus separated from the sensing element 30 by the length of the two coaxial cables 200 and need not be enclosed in the housing 10. The sensing coil is essentially and effectively extended using the coaxial cables 200. The length of the coaxial cables 200 is typically the same for each coaxial cable 200. Typical lengths are about 10 feet (3 meters), 16 feet (5 meters), 20 feet (6 meters), 50 feet (15 meters), or more. Thus, the improved sensor 100 with the coaxial cables 200 has no electronic components (active or passive) that need to be placed close to the sensing element 30.

The addition of the coaxial cables 200 to the sensor 100 allows for placement of the sensing element 30 in a harsh environment or in a location that is difficult to reach. Such placement is possible because all of the electronic components can be located at a remote site. The remote site can be one which is not exposed to harsh conditions, thus avoiding any compromise in performance and allowing for more flexibility in installing the sensor 100.

Because the helices 34, 36 of the senor coil are constructed of high-temperature magnet wire, there is almost no problem in using the sensing element 30 in harsh environments between −70 and 200° C. Magnet wire is copper that is coated with an insulator to prevent shorting when the wires touch. It is the insulation that fails around 200° C., which is why the sensor 100 uses ceramic strips on bare copper. The helices 34, 36 are preferably made of relatively large, flat wires, as opposed to conventional small round wires, to obtain high capacitance. Coaxial cables 200 suitable for harsh environments are readily available in the market.

The coaxial cables 200 do not affect the measurements obtained from the sensor 100. Although the coaxial cables 200 add capacitance to the resonant circuit, the added capacitance is a fixed amount that does not vary even if the coaxial cables 200 move around. The capacitance added by the coaxial cables 200 does set a limit on the maximum length of the coaxial cables 200 that can be used; there is a reduction in the frequency change due to the added capacitance which will be the limiting factor. The maximum length has been tested to about 20 feet (6 meters) but the limit is estimated to be in the hundreds of feet. Almost every known application would be covered by this amount of separation between the sensing element 30 and the electronics.

It might be possible to place the coaxial cables 200 between the coil and the electronics of an LVIT sensor (as opposed to the sensor 100). Such placement would theoretically allow the use of remote electronics in connection with the LVIT sensor. Because the coaxial cables 200 cannot shield magnetic fields as well as they do electric fields, however, they are not likely to work as well with inductive sensors such as the LVIT sensor. In addition, these sensors have analog signals so there still would be attenuation and distortion over long cables due to temperature-induced resistance changes in the conductor wires. These reasons might explain why there is no known use of coaxial cables with LVIT sensors.

Figure 4:
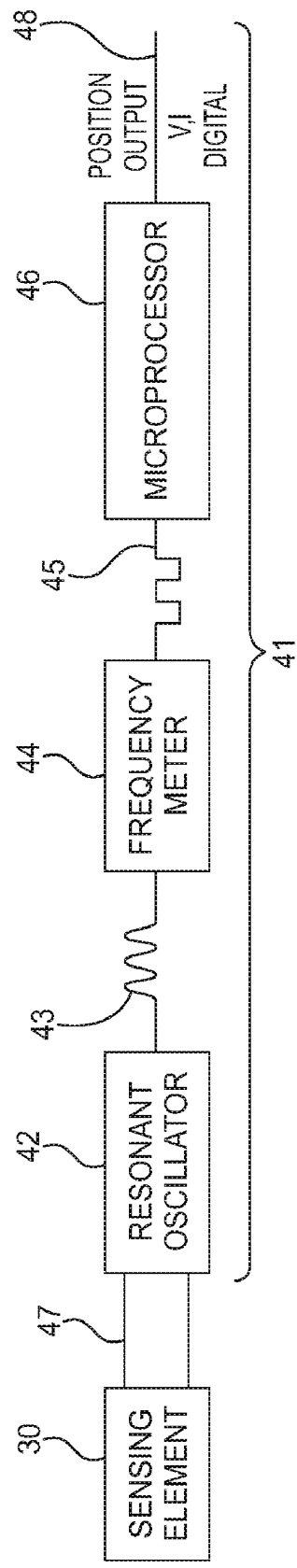
FIG. 4 is a representative block diagram illustrating a proximate electronics module that is connected to the sensing element via short wires in accordance with U.S. Pat. No. 8,692,541.

The various functions that are included within a typical electronics module in order to operate the sensor 100 as a position sensor are shown in FIG. 4. FIG. 4 is a representative block diagram of a conventional electronics module 41 that is connected to the sensing element 30 via a pair of short wires 47. Therefore, the conventional electronics module 41 can be called a "proximate" electronics module 41 because it is located proximate (i.e., within a few centimeters of and in substantially the same environment as) the sensing element 30. The electronics module 41 is typically manufactured as a single printed circuit board with electronic components mounted onto its surfaces. The electronics module 41 (including all of its components) is attached directly to the sensing element 30.

As shown in FIG. 4, the electronics module 41 includes a resonant oscillator 42 that is connected directly, via the short wires 47, to the sensing element 30. (Components are connected or joined directly when there are no intervening elements between the directly joined or connected components.) The resonant oscillator 42 oscillates, along with the sensing element 30, at the resonant frequency of the sensing element 30. The frequency depends on the value of a measured characteristic such as position. This position frequency is sent as a first signal 43 to a frequency meter 44. The frequency meter 44 converts the first signal 43 into a second signal 45 and sends the second signal 45 to a microprocessor 46. The microprocessor 46 converts the second signal 45 into either an output voltage (V) and current (I) or a digital number. The output signal indicates the position output 48 for the sensor 100.

The microprocessor 46 is a computer processor that incorporates the functions of a central processing unit (CPU) on a single integrated circuit (IC), or sometimes up to eight integrated circuits. The microprocessor 46 is a multipurpose, clock-driven, register-based, digital IC that accepts binary data as input, processes it according to instructions stored in its memory, and provides results (also in binary form) as output. Microprocessors contain both combinational logic and sequential digital logic. Microprocessors operate on numbers and symbols represented in the binary number system.

In the conventional electronics module 41, as described in the '541 patent, power conditioning circuits ensure that transient voltages (such as electrostatic discharge) or reversed connections will not damage the circuitry. The power conditioning circuits also include a voltage regulator and a voltage inverter to provide proper voltages to various parts of the electronics module 41. A typical regulated voltage is 3.3 VDC (volts, direct current). The inverter supplies a slightly negative voltage (e.g., about −1.0 VDC) so that the output amplifier of an output section can fully go down to 0.00 VDC when desired, with a position sensor having a voltage output. Optionally, the output can be digital format, with a sufficient number of connection wires to support the chosen format.

A sensing section includes a connection for the sensing element 30, the oscillator 42 coupled with the sensing element 30, a divider, and a selector. The oscillator 42 oscillates at a frequency that is indicative of the percentage of the measuring range of the sensing element 30 that is covered by the target tube 60. Because the oscillator frequency may be in the megahertz (MHz) region, a divider can be used to increase the period for easier measurement. The selector allows the selection of an appropriate number of stages of division. A control section includes the microprocessor 46 that receives the second frequency signal 45, selects the division amount, receives temperature information, and sends calibrated digital information to a digital to analog (D/A) converter. A programming port connects with the microprocessor 46 for loading of its operating firmware, and a calibration port is also connected for calibration in order to provide the desired scaling of the output. An output section receives an analog output from the D/A converter and produces the output voltage or current. The output section also includes protection of the output circuit from damage due to transient voltages or overcurrent. A digital output is also an option.

Relative to the conventional electronics module 41, the '541 patent illustrates and describes a simplified electronics module. The simplified electronics module is illustrated in FIG. 4 of the '541 patent and described in the accompanying text of that patent. The disclosure of the '541 patent is incorporated into this document by reference in its entirety.

Figure 5:
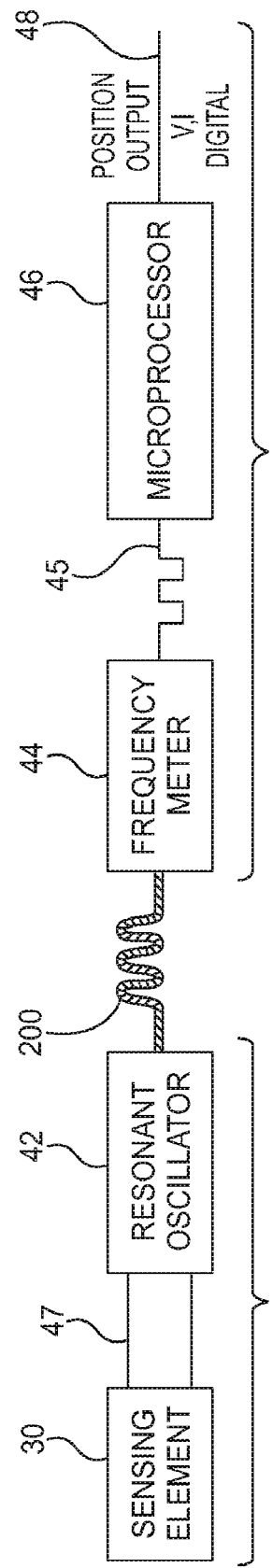
FIG. 5 is a representative block diagram illustrating a partially removed electronics module that is connected directly to a coaxial cable and only indirectly to a resonant oscillator and then to the sensing element.

As shown in FIG. 5 of this document, a single coaxial cable 200 could be located between, and used to interconnect, the resonant oscillator 42 and the frequency meter 44. In this configuration, only the resonant oscillator 42 is attached directly, via the short wire 47, to the sensing element 30. Such a configuration allows for a partially removed electronics module 49 comprising the frequency meter 44 and the microprocessor 46, but devoid of the resonant oscillator 42. The electronics module 49 is called "partially removed" because some of the electronic components are separated (i.e., removed) from the sensing element 30 by a significant distance defined by the length of the coaxial cable 200. The electronics module 49 (including all of its components) is attached directly to the coaxial cable 200 and only indirectly to the sensing element 30 through the resonant oscillator 42. Because the resonant oscillator 42 must be in the same environment as the sensing element 30 in the configuration of FIG. 5, however, the main advantages of incorporating the coaxial cable 200 into the configuration are not achieved.

Figure 6:
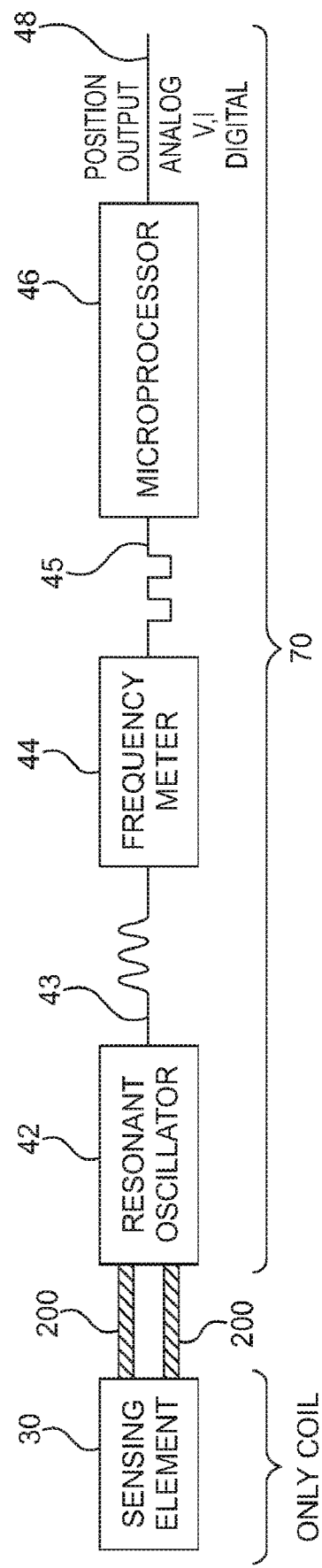
FIG. 6 is a representative block diagram illustrating a remote electronics module that is connected to the sensing element via coaxial cables according to the present invention.

Preferably, the addition of the coaxial cables 200 to the sensor 100 allows all of the electronics of the sensor 100 to be located at a significant distance from the sensing element 30. Therefore, as stated above, the addition of the coaxial cables 200 to the sensor 100 allows for placement of the sensing element 30 in a harsh environment or in a location that is difficult to reach. As shown in FIG. 6, one coaxial cable 200 is connected directly to each one of the helices 34, 36 of the sensing element 30. The coaxial cables 200 are located between, and used to interconnect, the sensing element 30 and the resonant oscillator 42. Such a configuration allows for a remote electronics module 70 comprising all of the electronic components (the resonant oscillator 42, the frequency meter 44, and the microprocessor 46) to be located a significant distance (i.e., remote) from the sensing element 30. That distance is defined by the length of the coaxial cables 200. The electronics module 70 (including all of its components) is attached directly to the sensing element 30 through the coaxial cables 200. Because all of the electronics of the sensor 100 are remote from the environment of the sensing element 30 in the configuration of FIG. 6, the main advantages of incorporating the coaxial cables 200 into the configuration are achieved.

According to an embodiment of the present invention illustrated in FIG. 7, an apparatus for the measurement of linear position has at least one electromagnetic sensing element 30 connected to an RF or microwave oscillator 4 and to a measuring circuit 5. The measuring circuit 5 includes at least a first converter 14 for converting the oscillating signal to a frequency value and then passing on this information to a microprocessor. The microprocessor converts the data into an electrical signal, such as a DC (direct current) voltage or a digital number, and a second converter 15 converts the electrical signal into a measurement of linear position.

The sensing element 30 is formed by a section of a coupled slow-wave structure 6 formed by impedance conductors 7 and 8 (e.g., inner and outer helices 34 and 36, respectively) installed on a dielectric base 13 (e.g., electrically insulated rod 32) disposed along an axis 13a. The slow-wave structure 6 is connected by terminals 16, 17, through the coaxial cables 200, to the oscillator 4. The slow-wave structure 6 also has terminals 18 and 19, which can be connected to additional coaxial cables 200 and can be open, loaded with an impedance, shorted, or connected to the measuring circuit 5.

Each of the impedance conductors 7, 8 are curled into a helix or spiral with opposing directions of winding. The pitches of the impedance conductors 7, 8 are chosen to provide the desired distribution of the magnetic field within the distance between the sensing element 30 and a target 3. In the case of a set of coaxial helices, the spacing between the helices 34, 36 and the cylindrical target 3 should be less than the average radius of the helices 34, 36.

The oscillator 4 excites a sine wave or complex signal in the sensing element 30. This signal reflects from the sensing element 30 or passes through it, causing a voltage difference to appear across the terminals 16, 17 and the terminals 18, 19, the magnitude of which depends on the distance to the target 3. Therefore, a change in the distance leads to a change in the voltage differences, and that in turn leads to a change in at least one parameter of the sensing element 30. The parameter of the sensing element 30 that changes, and is measured, can be the impedance, resonant frequency, phase shift, or the like.

The frequency of the oscillator 4 can be constant, or it can be variable, depending on the measured parameter and the circuit used. With a constant frequency, the signal from the oscillator 4 can be split between two paths of a bridge circuit. One path is loaded by the sensing element 30, while the second path is loaded by a reference load. The voltage difference between the signals of the two paths is determined and amplified by a differential amplifier and can be used to indicate a signal depending on the impedance of the sensing element 30.

With variable frequency operation, the sensing element 30 is connected in the feedback circuit 27 of the oscillator 4, thereby changing its frequency in response to changes in the measured position (FIG. 7). Other measuring circuits can be used for converting the electromagnetic parameters of the sensing element 30 into a reading of linear position and related indications. In all versions of measurements according to the present invention, at least one coupled slow-wave based sensing element and at least one electrically conductive target 3 are used. In some cases, an electrically conductive surface of an object 2 can be used as the target 3.

FIG. 8 demonstrates yet another embodiment of the present invention. In this embodiment, a metal tube with an internal diameter is the movable target 3. The sensing element 30 is connected into a feedback circuit of a Pierce oscillator 4, the operating frequency of which is used to indicate the measured linear position, or measured distance. For a distance in the range between 0 and 100 mm, the frequency will increase approximately proportionally to the linear position. The sensitivity is very high (approximately 56 kHz per millimeter).

In some applications it is desirable to deploy multiple sensors making identical measurements of the same characteristic (e.g., distance or motion or level). In a dual redundant system (two sensors), when both sensors produce the same result the data are assumed to be accurate. If the two sensors disagree, however, then the data from both sensors are suspect and must be disregarded. With a triple redundant system (three sensors), when at least two of the sensors agree, the system can continue operation based on the values of the two sensors in agreement and the value from the third sensor is ignored.

With conventional LVDT and magnetostrictive sensors, redundant systems can be deployed only by installing two or three separate sensors and then mechanically coupling each of them to the same target (e.g., a movable object). This linkage introduces errors due to differences in alignment, backlash (lost motion), and other imperfect attributes of the mechanical coupling. By comparison, the sensor 100 has the ability to make a true double or triple redundant measurement without any need for separate linkages and only a small increase in the physical size of the sensor 100.

The sensor 100 has few components and is extremely robust and reliable. Nevertheless, in some critical applications redundancy may still be desirable. The ability of the sensor 100 to perform a true double or triple redundant measurement with only a slight expansion of its physical size is both practical and elegant. In these embodiments, the sensor 100 implements two or three position-sensing sets of helices 34, 36 (each set of helices 34, 36 in the sensing element 30 forming a resonator), and one target 3, in the same physical space as a single set of helices 34, 36 and target 3.

Figure 9:
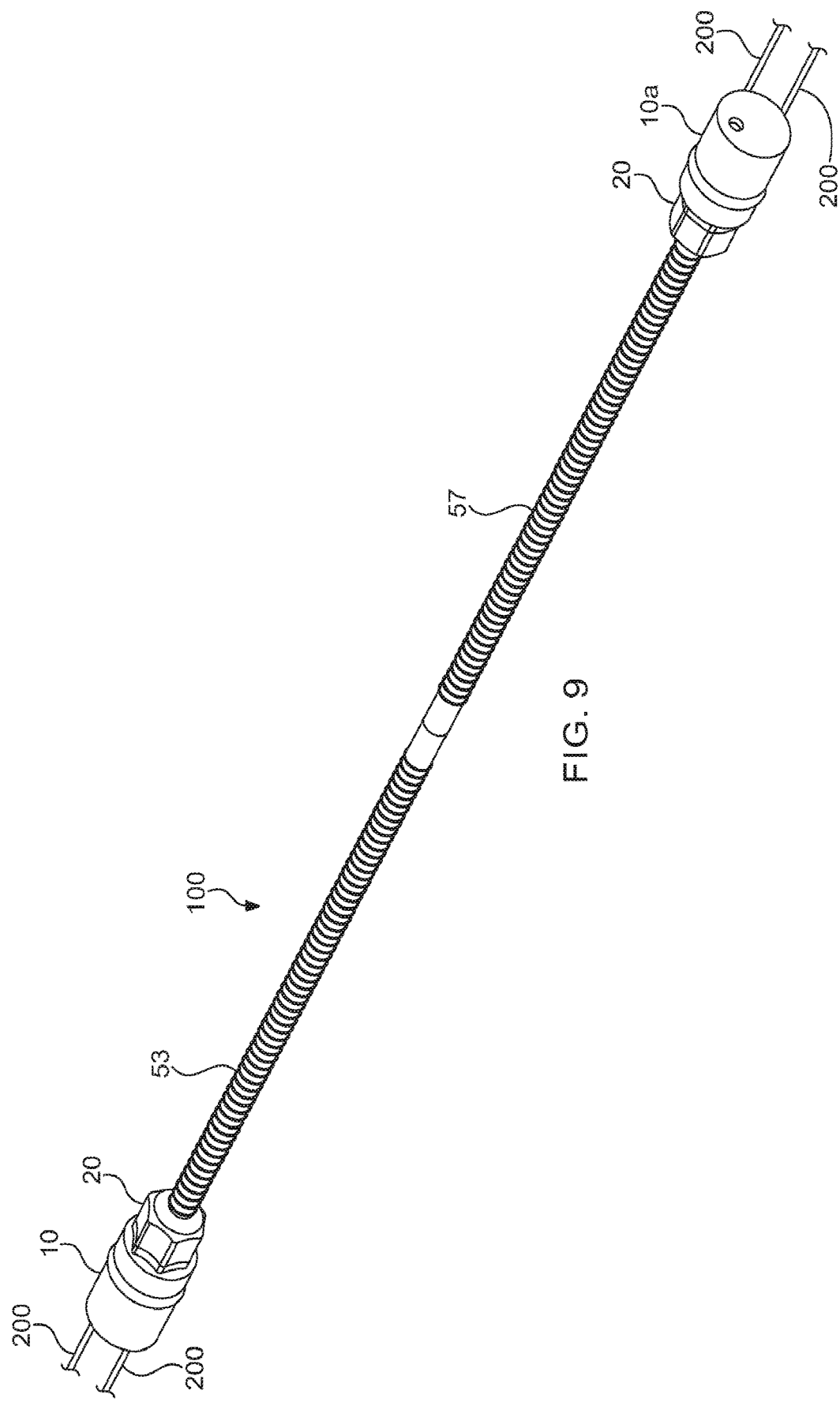
FIG. 9 illustrates a dual-redundant sensor according to the present invention with the target tube removed to highlight the first and second coils.
Figure 10:
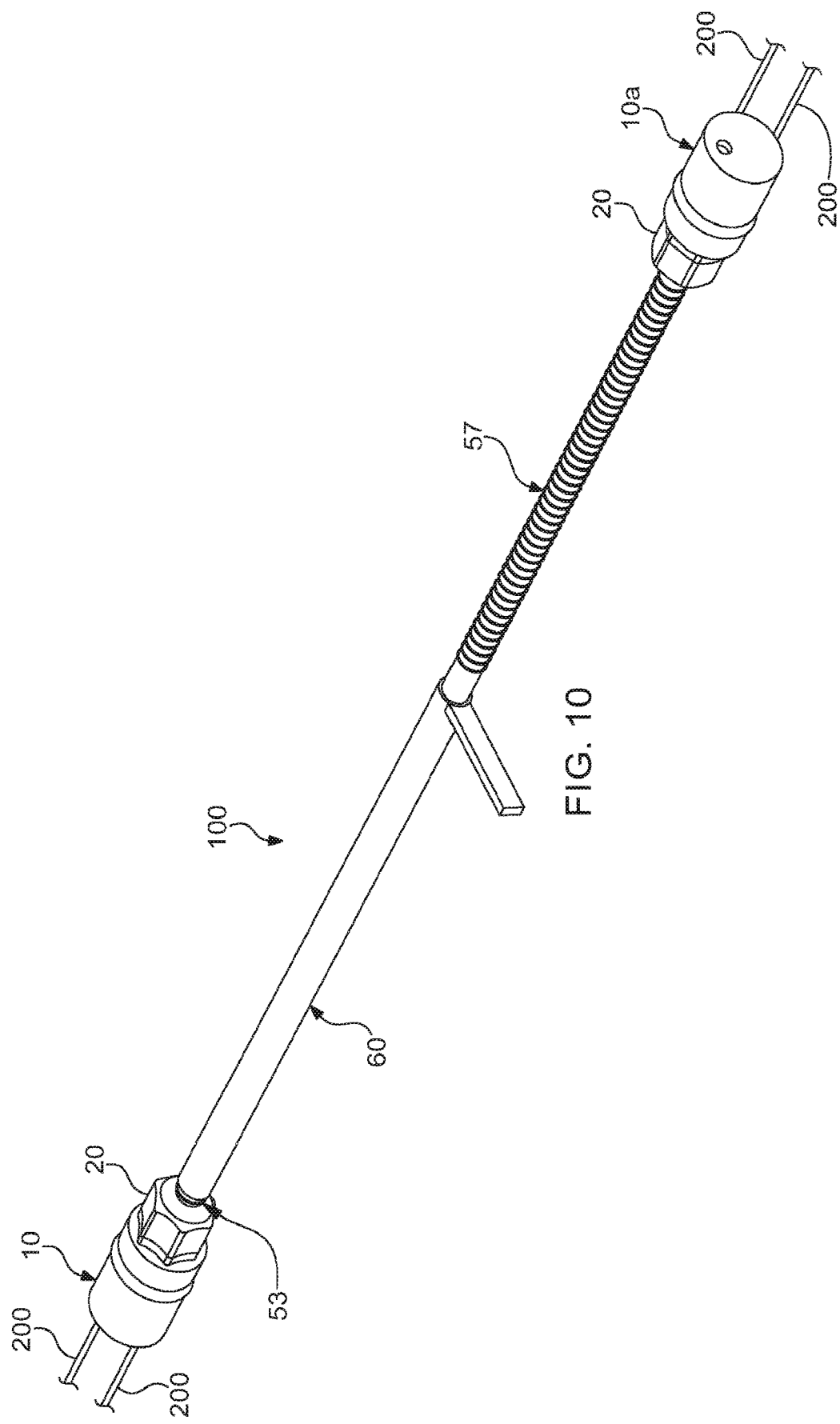
FIG. 10 illustrates the dual-redundant sensor shown in FIG. 9 with the target tube in place.

For a double redundant system, the nonconductive shaft or electrically insulated rod 32 of the sensor 100 can be extended and a second coil wound on this extension, as shown in FIGS. 9 and 10. The first set of helices 34, 36 form a first coil 53; the second set of helices 34, 36 form a second coil 57. The sensor 100 having two coils 53, 57 can be said to have two channels of measurement and can provide dual-redundant measurement of the same position. FIG. 9 shows two sets of helices 34, 36 forming the two coils 53, 57 aligned linearly (or, in-line) with one-another. Alternatively, the two coils 53, 57 can be aligned concentrically, with one coil surrounding the other, and the target tube 60 moving in the annular space between them, as will be shown for the third channel of FIG. 12.

In the two-channel version of FIGS. 9 and 10, a pair of coaxial cables 200 are connected to the first set of helices 34, 36 that form the first coil 53 within the housing 10 and a second pair of coaxial cables 200 are connected to the second set of helices 34, 36 that form the second coil 57 within a housing 10A. The coaxial cables 200 connect on their ends opposite the first and second coils 53, 57 with one or more electronic modules. As shown in FIG. 10, the target tube 60 position is near 100% coverage of the first coil 53, toward the left, and near 0% coverage of the second coil 57. If the target tube 60 is moved to the right, then the second coil 57 will continue to increase being covered toward 100%, as the first coil 53 will continue to be uncovered toward 0%.

Figure 11:
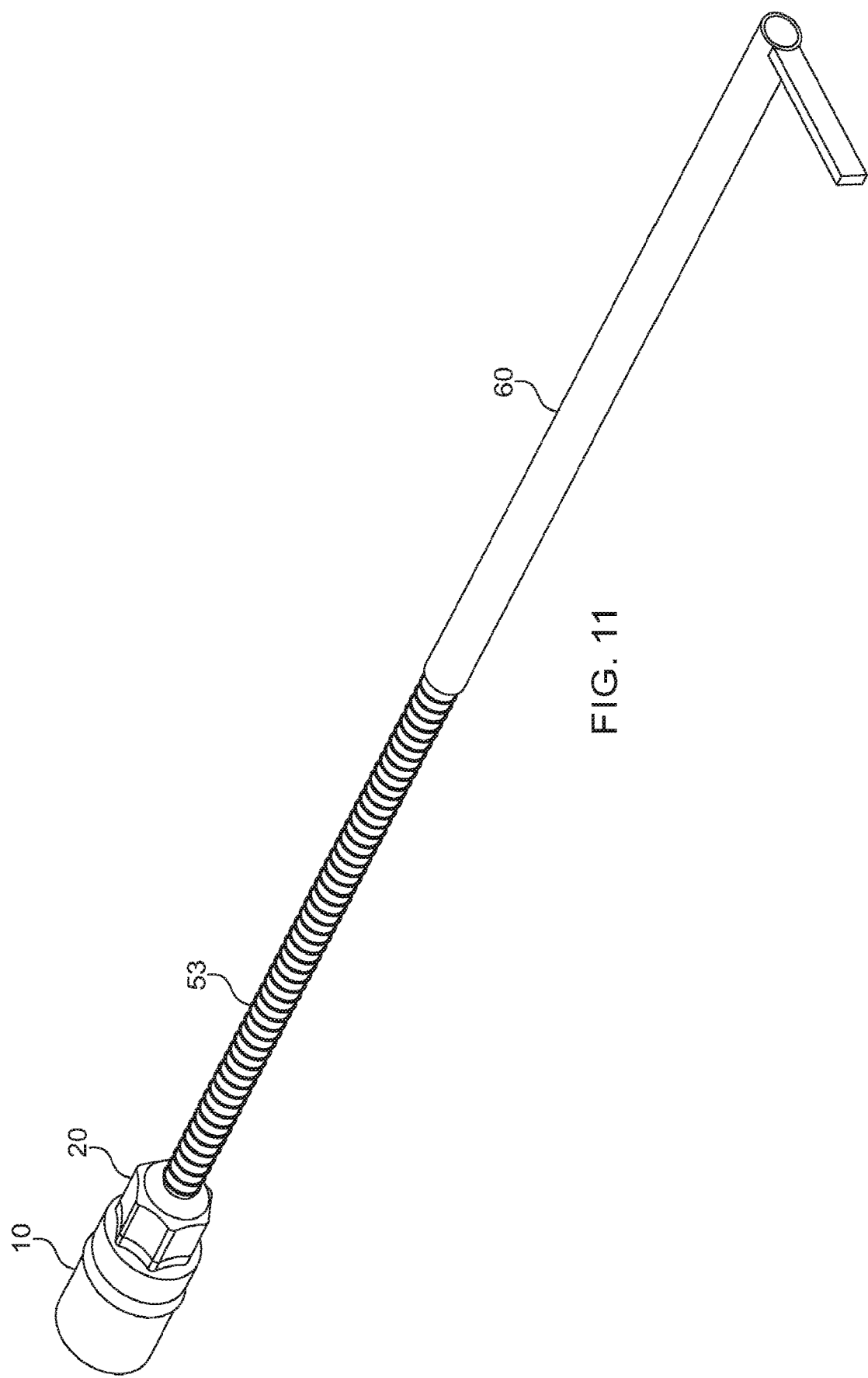
FIG. 11 illustrates the dual-redundant sensor shown in FIGS. 9 and 10 with the target tube at full extension.

At first glance, the configuration of the two-channel version of the sensor 100 shown in FIGS. 9 and 10 appears to double the length of the sensor 100. But that observation is not true. The conductive target tube 60 that covers the sensing element 30 must have an extra space equal to the length of the sensing element 30 into which it is withdrawn when the coil 53, 57 is uncovered. This configuration is shown in FIG. 11 with the target tube 60 at full extension.

When two sensing elements 30 are located on the same electrically insulated rod 32, the single target tube 60 serves two functions. As the target tube 60 uncovers the first coil 53 it simultaneously covers the second coil 57. Thus, a redundant sensor 100 requires no additional space. More important, however, both coils 53, 57 measure the same moving surface with no requirement for mechanical attachments.

The sensor 100 can easily be extended to a triple redundant system by adding a third coil 59. The third coil 59 is wound on a larger diameter hollow non-conductive tube 61 that fits over the moving target tube 60. The target tube 60 moves in an annular space between the first coil 53 and the third coil 59. The first coil 53 is barely visible in FIG. 12, because it is located concentrically within the third coil 59. The target tube 60 covers more or less of the first coil 53 and the second coil 57 as it is moved from left to right, as explained above for FIGS. 9 and 10. The second coil 57 is positioned in-line with the first coil 53. The outer third coil 59 will resonate (albeit at a different frequency from the first coil 53 and the second coil 57) in response to movement of the target tube 60. This configuration is shown in FIG. 12 as an exploded view showing the three coils 53, 57, 59 and the target tube 60 that forms the actual measurement point 63.

Figure 12:
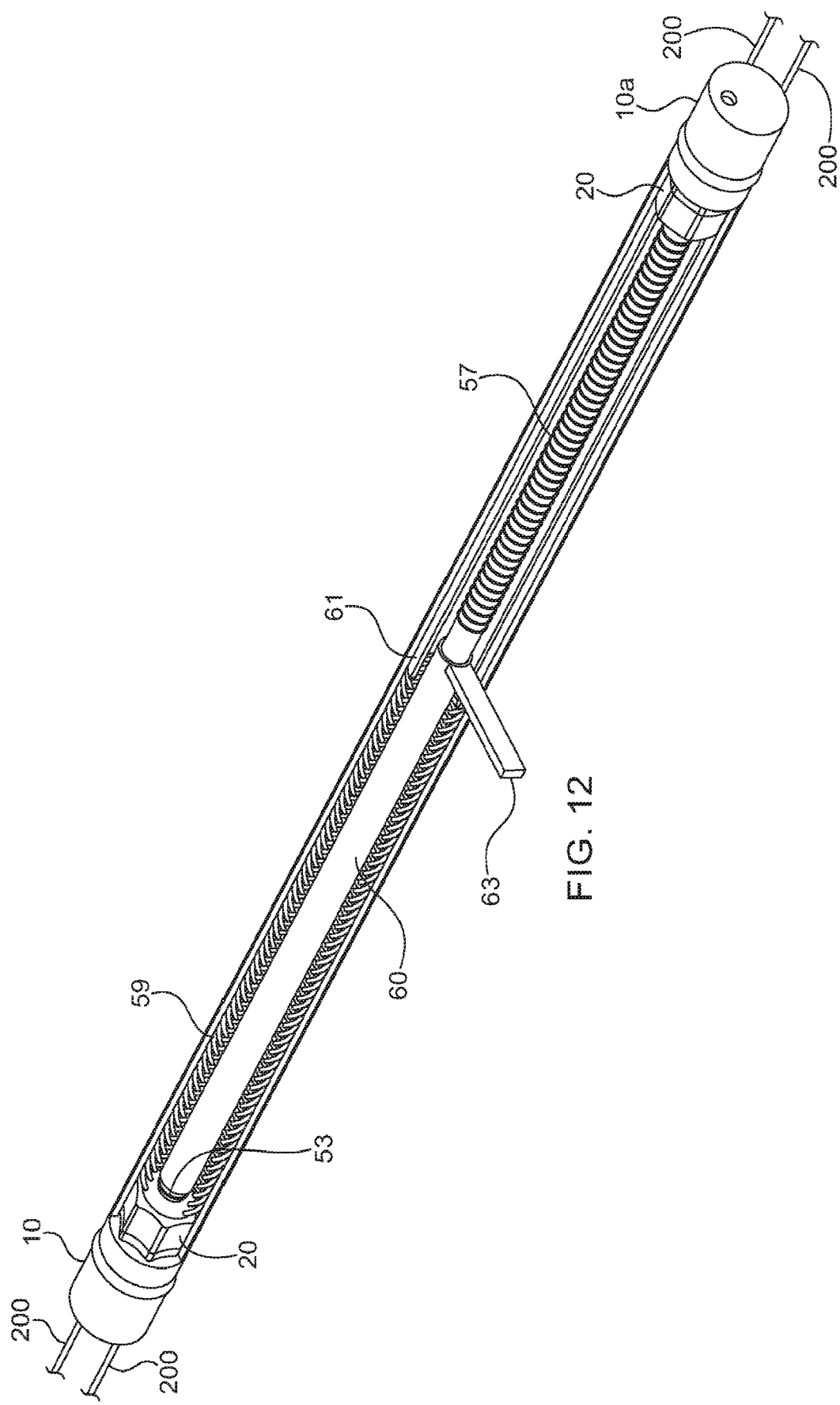
FIG. 12 illustrates a triple-redundant sensor according to the present invention.

The sensor 100 illustrated in FIG. 12 can provide three, separate measurements based on the same moving target tube 60. All three coils 53, 57, 59 can be calibrated at the same time. There is some penalty in size for having the third coil 59, in that the diameter of the total sensor 100 has increased slightly, although the length (which is usually the more important parameter) remains unchanged.

EXAMPLES

The following examples are included to more clearly demonstrate the overall nature of the invention. These examples are exemplary, not restrictive, of the invention.

Linear measurement tests were performed using the single non-redundant sensor 100 having coaxial cables 200 as described above. The length of the coaxial cables was about 4.8 meters (16 feet). Specifically, Sensor Serial Number 19142Re-Test, Part Number A5-8.0-M12-R4-R4-B0139, was tested. Table 1 shows the test results.

TABLE 1

| Position (Inches) | Output (Volts) | Error % of Full Scale |
|---|---|---|
| 0.053 | 0.088 | −0.008% |
| 0.266 | 0.352 | −0.034% |
| 0.533 | 0.681 | −0.079% |
| 0.800 | 1.021 | −0.012% |
| 1.067 | 1.353 | −0.028% |
| 1.333 | 1.688 | −0.011% |
| 1.600 | 2.020 | −0.027% |
| 1.867 | 2.354 | −0.022% |
| 2.133 | 2.693 | 0.032% |
| 2.400 | 3.023 | −0.004% |
| 2.667 | 3.358 | 0.012% |
| 2.934 | 3.695 | 0.047% |
| 3.200 | 4.029 | 0.051% |
| 3.467 | 4.366 | 0.084% |
| 3.734 | 4.698 | 0.071% |
| 4.001 | 5.028 | 0.033% |
| 4.268 | 5.366 | 0.079% |
| 4.535 | 5.698 | 0.060% |
| 4.801 | 6.026 | 0.008% |
| 5.068 | 6.356 | −0.031% |
| 5.335 | 6.691 | −0.016% |
| 5.602 | 7.023 | −0.032% |
| 5.868 | 7.355 | −0.045% |
| 6.135 | 7.691 | −0.022% |
| 6.402 | 8.026 | −0.007% |
| 6.668 | 8.357 | −0.032% |
| 6.935 | 8.690 | −0.036% |
| 7.202 | 9.023 | −0.041% |
| 7.469 | 9.360 | −0.007% |
| 7.735 | 9.694 | 0.001% |
| 8.002 | 10.029 | 0.015% |

Figure 13:
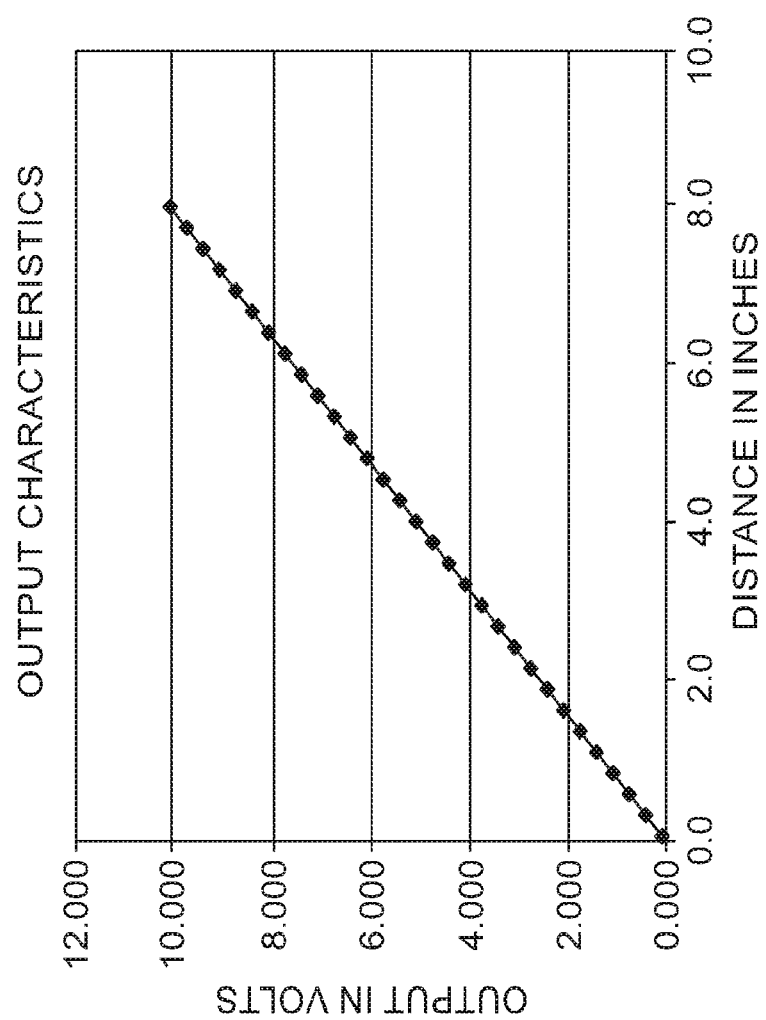
FIG. 13 graphically reflects the test results of a sensor constructed in accordance with the present invention as a plot of output of the sensor in volts against the distance measured in inches.

FIG. 13 graphically reflects the test results as a plot of output of the sensor 100 in volts against the distance measured in inches. The abscissa and the ordinate are the horizontal and vertical axes, respectively, typically the x-axis and y-axis of a two-dimensional graph. FIG. 13 shows the output of the sensor 100 on the ordinate and the distance on the abscissa. A best fit line can be calculated for the data according to the equation for a straight line, Y=M(X)+B, where M is the slope of the line and B is the intercept of the line with the ordinate. For the data provided above, the slope, M, is 0.800 and the intercept, B, is −0.018 so that the best fit line has the equation Y=0.800(X)−0.018.

Figure 14:
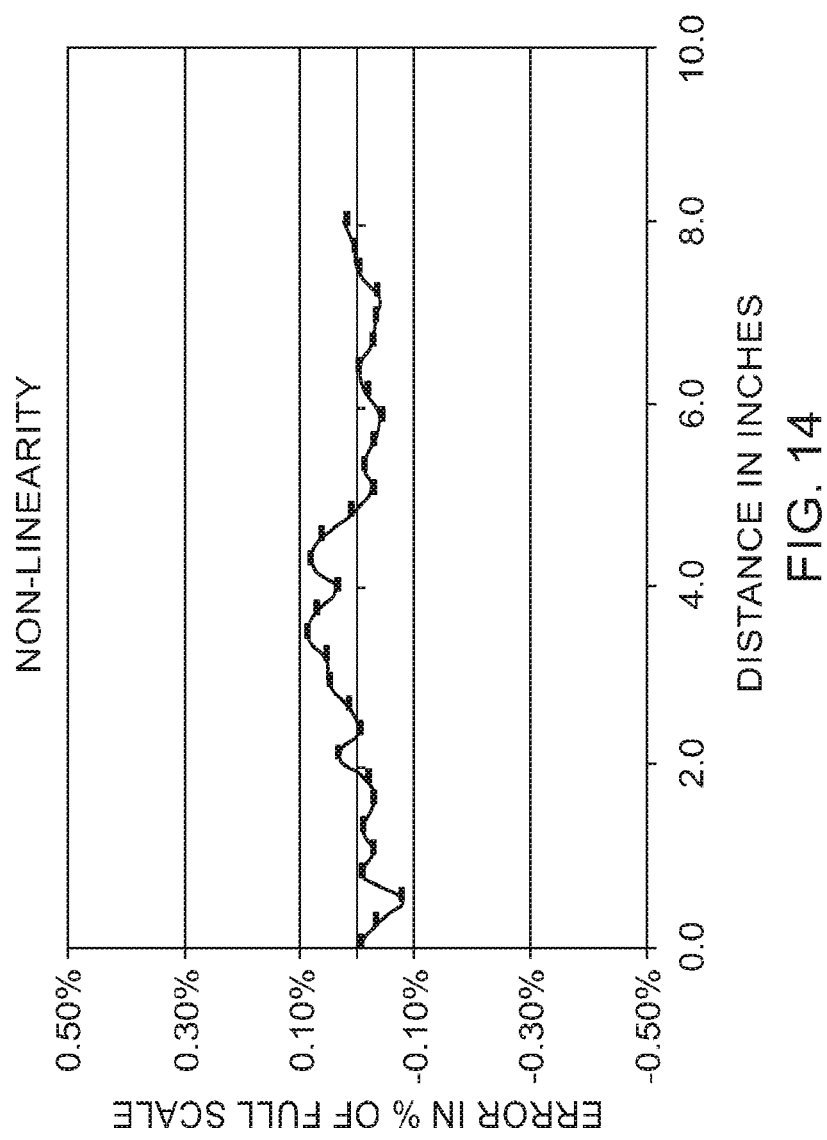
FIG. 14 graphically reflects the non-linearity of the test results as a plot of full scale error percent against the distance measured in inches.

FIG. 14 graphically reflects the non-linearity of the test results as a plot of full scale error percent against the distance measured in inches. The non-linearity fluctuates within a band of ±0.082%. The linear error is a measure of the accuracy of the sensor 100.

Figure 15:
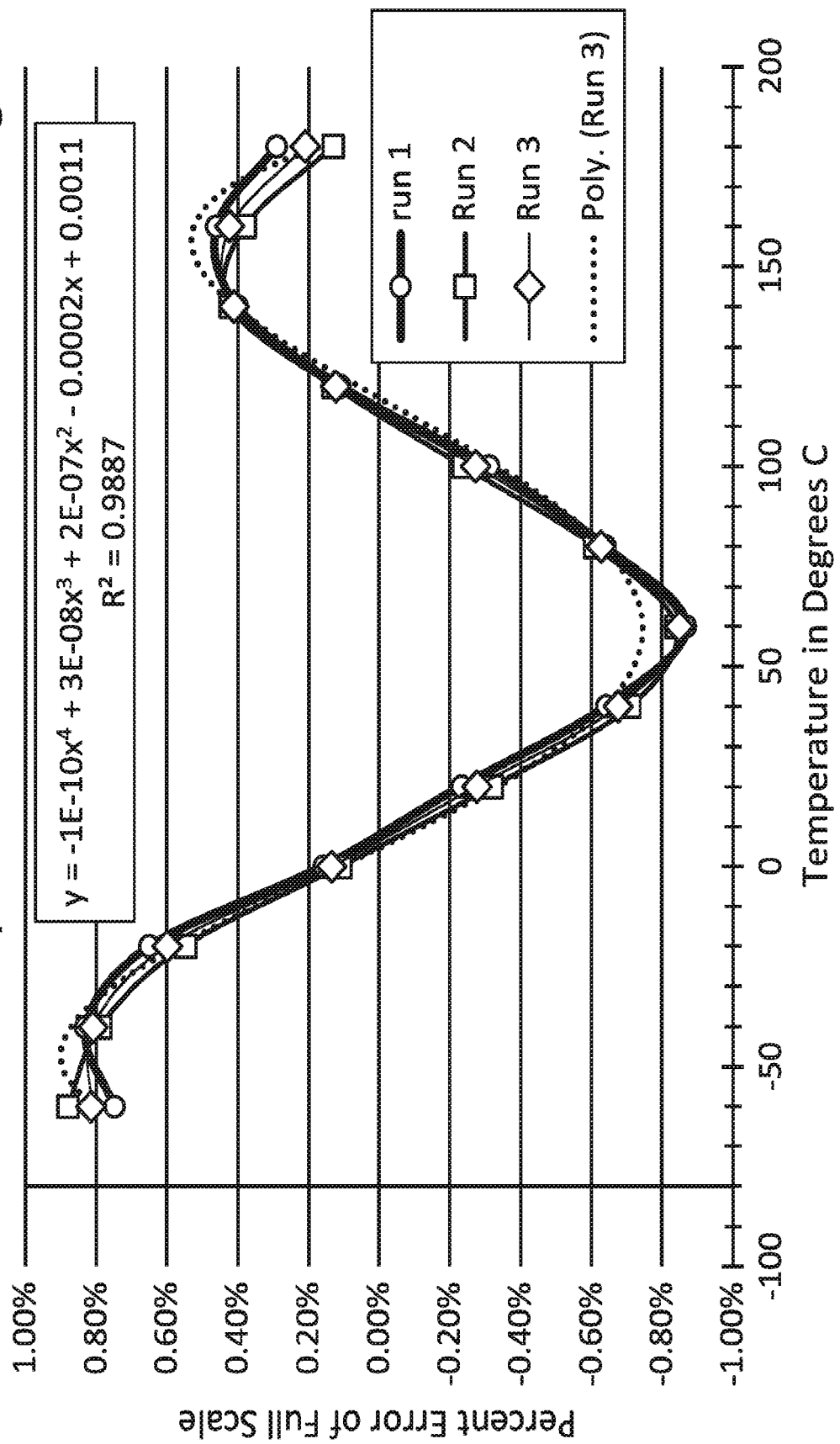
FIG. 15 is a graph depicting a series of three tests run from −70 to 180° C. for a sensor constructed in accordance with the present invention as a plot of percent error of full scale against temperature.

The graph of FIG. 15 shows a series of three tests run from −70 to 180° C. for the sensor 100. The sensing element 30 used in this example includes magnet wire wound on a ceramic rod held together with Kapton® tape. (Kapton® tape is made from Kapton® polyimide film with silicone adhesive. Such tape is compatible with a wide temperature range as low as −269° C. and as high as 260° C. Kapton is a registered trademark of E.I. du Pont de Nemours and Company.) As can be seen in the graph of FIG. 15, reproducibility of the sensor 100 is excellent and the total error in this temperature range is less than ±1% of full scale. The test data can be fitted with a polynomial equation, specifically, in this example, the equation $y=-1E-10x^4 +3E-08x^3+2E-07x^2-0.0002x+0.0011$. The dotted curve for the polynomial equation is included on the graph of FIG. 15. $R^2$ for this fit is 0.9887. ($R^2$ is a statistical measure of how close the data are to the fitted regression curve. It is known as the coefficient of determination, or the coefficient of multiple determination for multiple regression.) The fitting allows correction of even this small error down to virtually zero by monitoring the temperature and correcting the output. The errors are not linear because the expansion and contraction of the materials involved include volume, area, and linear effects but are reproducible.

Figure 16:
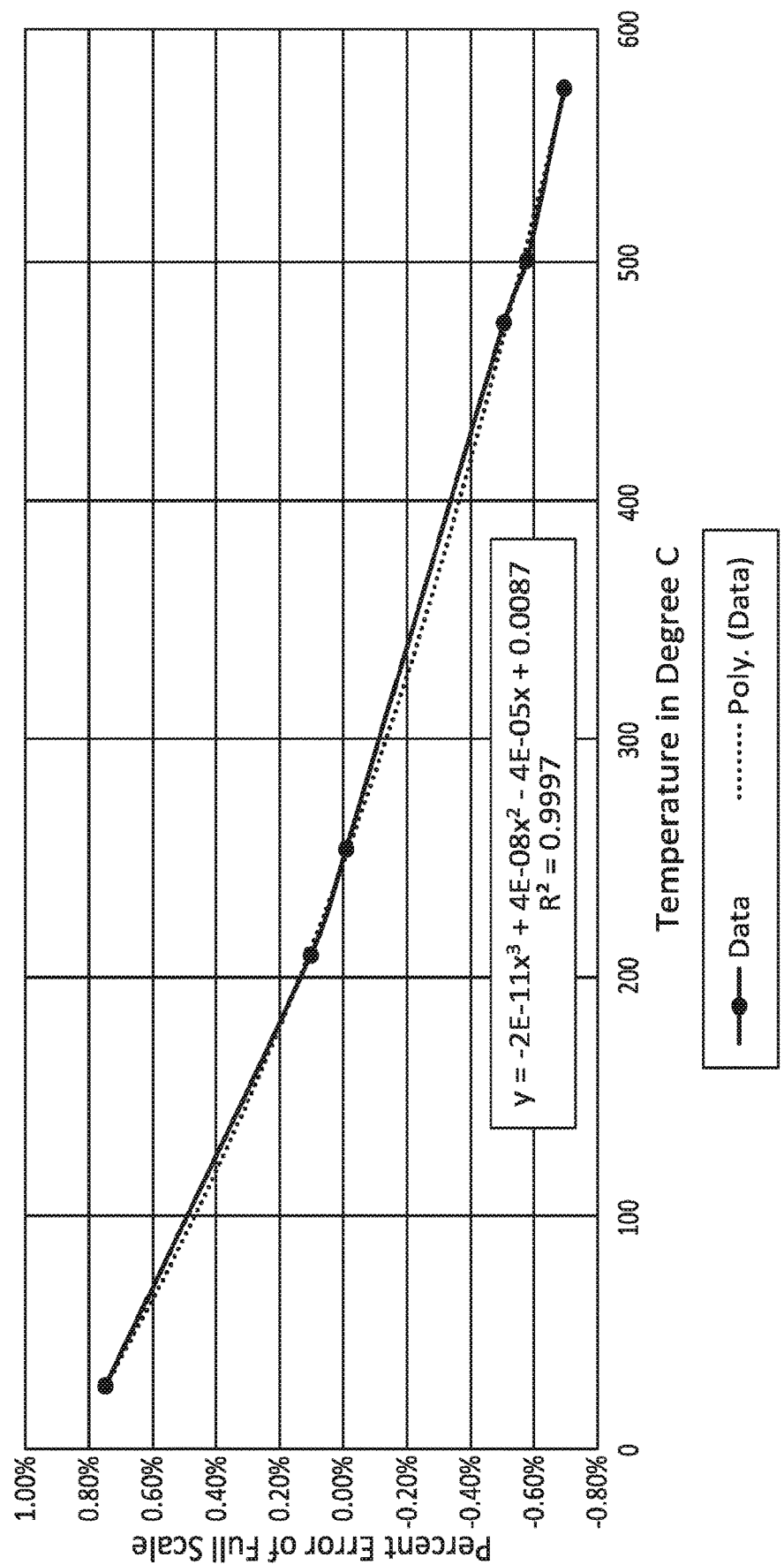
FIG. 16 is a graph depicting high-temperature tests for a sensor constructed in accordance with the present invention as a plot of percent error of full scale against temperature.

The graph of FIG. 16 reflects data for high-temperature operation of the sensor 100 up to 580° C. The magnet wire is replaced in this example with bare copper wire and ceramic tape as insulation between the coils of the sensing element 30. As can be seen, the maximum error still remains within ±1% error of full scale and can also be fitted with a polynomial equation. Specifically, in this example, the equation is $y=-2E-11x^3+4E-08x^2-4E-05x+0.0087$. The dotted curve for the polynomial equation is included on the graph of FIG. 16. $R^2$ for this fit is 0.9997.

Figure 17:
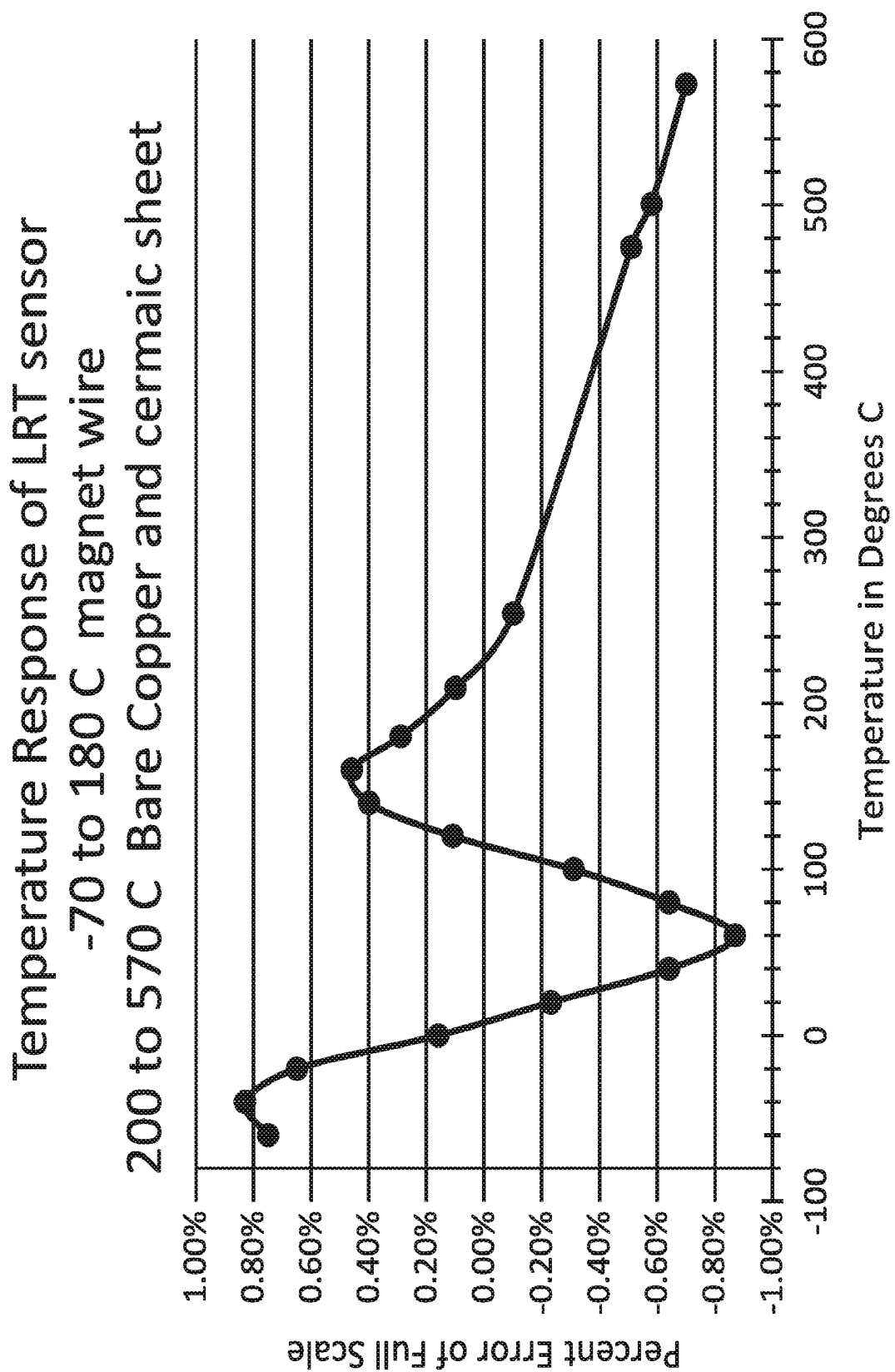
FIG. 17 is a graph that combines the data of the two graphs of FIGS. 15 and 16.

The graph of FIG. 17 combines the data of the first two graphs of FIGS. 15 and 16, respectively. FIG. 17 shows that the minimal errors are continuous and reproducible from −70° up to 580° C. A temperature of 580° C. is the maximum for copper wire because copper rapidly oxidizes at higher temperatures. Higher and lower temperatures can be achieved by substituting different metals for the coils of the sensing element 30 such as tungsten, molybdenum, and platinum which would extend the temperature range from near absolute zero to over 3,000° C. Although sensors have not been tested in these extreme temperature ranges, technology for making such coils is readily available and in common use. The resistance of most metals changes with temperature but this change does not affect the output of the sensor 100. (This temperature variation could be used as a crude temperature sensor but is not reliable.) This is due to the fact that in a resonant circuit the change in resistance only affects the amplitude of the signal and not the frequency. The sensor 100 uses the frequency for measurement and the amplitude is not a factor so long as the amplitude stays above a certain threshold.

The sensor 100 is suitable for a wide variety of applications. Among the more important applications are high-temperature operations such as power plants, jet engines, ovens, and combustion engines. Low-temperature operations (less than about −60° C.) are also important, especially in aviation. The various moving devices on airplanes are consistently exposed to low temperature when cruising at high altitude. In robotics, the ability to place many very small sensors 100 throughout the robot and place the control circuits in a central location is beginning to mimic the human body. Exploring for oil and gas requires making deep measurements in the earth, where temperatures can exceed 225° C. In essence, the sensor 100 can replace LVDT sensors in all applications currently monitored using LVDT sensors—especially in those applications above the absolute temperature limit for LVDT sensors of about 500° C.

Focusing on jet engine applications as an example, the sensor 100 is especially well-suited to make proximity measurements. A flat coil when excited will change its resonance frequency as it approaches any metal conductive surface. This measurement is very important in measuring the gap between turbine blades tips and the outer housing of jet engines and can only be performed now at room temperature. In an operating engine the temperatures reach thousands of degrees and few, if any, electronic components can survive such temperatures. By using the sensor 100, with a sensing element 30 made with platinum helices 34, 36 (tungsten helices 34, 36 are used for less harsh environments) and connecting coaxial cable 200, an accurate gap measurement can be obtained despite such temperatures. It is then possible to make this measurement in an operating engine.

For example, because the bandwidth of the sensor 100 is several Mhz, the sensor 100 can be used to measure the gap of each turbine blade tip as it passes the sensor 100 during operation of the jet engine. A modified sensor 300 useful to measure that gap is illustrated in FIGS. 18A, 18B, and 18C. FIG. 18A shows the helices 34, 36 as wound into coils. The coils are then folded over each other and imbedded into a ceramic body 302 as shown in FIG. 18B. FIG. 18C is a side view of the modified sensor 300 as located in the cowling wall with the turbine blade 304 above the sensor 300 and two coaxial cables 200 leading from the coils and extending out from the ceramic body 302. The ceramic body 302 functions as an insulator.

The top of the modified sensor 300 must be flush with the interior surface of the engine cowling which means that a recess would have to be formed in the outer wall and holes (for the feedthrough) drilled through to the outside. The ability to produce precision ceramics for the ceramic body 302 means that the sensor 300 can conform to the curvature of the cowling without additional grinding steps. With ceramic being the only exposed surface to the engine environment, and with the electronics located remotely, the modified sensor 300 can withstand the extreme chemical, temperature, vibration, and pressure conditions of an operating jet engine and should easily meet a 10,000 operating hours requirement. The weight of the modified sensor 300 is a few ounces.

Because the frequencies and bandwidth being measured are in the MHz region, the modified sensor 300 can detect a single blade 304 passing the modified sensor 300. This will produce a gap measurement for each blade 304 although it may require averaging over many cycles. Because every blade 304 will have a slightly different geometry, it may be possible to develop a "map" of all the blades 304 to identify the absolute blade number. This could be very valuable for monitoring changes in blade lengths while the engine is in operation.

Another application for the sensor is firing ceramic components in a kiln. Ceramic parts are made by molding ceramic particles with a binder (usually a wax or oil) into a fixed shape and then firing the molded part at a high temperature. During the firing process, the part shrinks as the binder boils off and the particles bind together eliminating the spaces between them. This shrinkage is critical to producing good parts and parts that are not completely fired will be defective. When developing a firing pattern for a certain ceramic part, experiments are done to see how much time and temperature are needed to produce the fully fused part. Because temperature cycle times for firing range from several hours to several days, these are long and laborious experiments. Even when completed, firing schedules are usually extended to ensure that full shrinkage has been obtained.

The sensor 100 can measure the shrinkage when the sensor 100 is installed in the kiln at the elevated temperatures. A simple spring-loaded plunger attached to the target and pushing against the part to be fired can measure the shrinkage with good accuracy. The mechanical parts of the sensor 100 (spring, target tube, etc.) would have to be made, of course, out of a refractory metal such as tungsten, platinum, or molybdenum but such machine parts are routinely used in high-temperature ovens. The ability to determine that a part has fully shrunk would offer an enormous economic saving for ceramic manufacturers. Use of the sensor 100 would allow manufacturers to shorten or even eliminate much of the experimentation and can reduce cycling times. There is nothing available that can make this kind of measurement at these elevated temperatures.

Superconductivity is a phenomenon that occurs at very low temperatures. At such temperatures, certain metals lose all their resistance to current flow. In addition to having this unique characteristic, another feature of superconductivity is that the magnetic field generated by flowing current is excluded from the body of the metal. This feature is useful in making superconducting electromagnets which are currently used in almost all MM scanners. The sensor 100 does not generate an external magnetic field, however, given the opposite windings of the coils of the sensing element 30. Each winding produces a magnetic field but in opposite directions, so they cancel each other out. The lack of any magnetic field outside a superconducting sensor could be advantageous to certain measurements made at these extremely low temperatures. Magnetic fields are difficult to shield and can cause interference in low level measurements. There is even the possibility that using the sensor 100 on a small scale could be beneficial in quantum computers where the presence of a strong magnetic field would be detrimental. The ability to have a sensor 100 that can measure position while producing no external magnetic field could be advantageous in many applications.

In summary, the sensor 100 is a relatively simple, economical, and compact device that can make accurate and reliable linear measurements in almost any environment using coaxial cables 200. Although the disclosure focuses on linear sensors, the concepts disclosed above also apply to other configurations of the sensor 100, including radial or rotary motion, proximity, and liquid levels. The coil configuration is different for each measurement but the electronics are the same.

Obtaining an output proportional to a frequency rather than an analog voltage or current has many advantages. The first advantage is that frequency is a digital signal so the amplitude of the signal is not important as long as it is above the threshold of detection. All conventional sensors produce an analog signal which makes them susceptible to noise, attenuations, and other distortions. Many other sensors require that the analysis electronics be close to the sensor or if the electronics can be located remotely, they have extensive correction codes to compensate for these analog errors.

The sensor 100 can be used to measure, among other parameters, linear or rotary position, gaps, and liquid levels. An important function of the sensor 100 is its use as an absolute linear encoder which can measure lengths from a few millimeters up to one meter while maintaining accuracies in the micron region. The output of the sensor 100 is frequency, a digital signal, and is not sensitive to noise and attenuations in the signal path. The sensor 100 requires only a standard frequency meter to interpret the position of an object 2. The sensor 100 requires no magnets or magnetic material and is insensitive to external magnetic fields. The sensor 100 can be manufactured with redundancy in the same physical package with only a small increase in diameter (but not length) and can be made triple redundant allowing majority logic. The same, unchanged length can be achieved for both double and triple redundancy embodiments of the sensor 100.

The sensor 100 described above offers several advantages when compared to the existing competing technology of the LVDT. The sensor 100 far exceeds the performance of an LVDT as it is smaller, more accurate, and cheaper to manufacture. The LVDT can be viewed simply as a transformer with a moveable core. As the core moves in and out (which is the motion being measured), the transformer output voltage between the primary and secondary coils changes. If the coils are properly wound, the change in output voltage is linear (or almost linear) with the motion. Electronics are required to control the LVDT and must compensate for the effects of the wiring between sensor and electronics. The LVDT upper temperature limit is nominally 200° C. but that can be raised at great cost and effort to about 500° C. The sensor 100 has been operated to 580° C. and expectations are that the temperature limit for the sensor 100 is considerably higher (i.e., about 1,000° C. or more).

The electronics that produce an input voltage to the primary coil and measure the output of the secondary coil for the AC version of the LVDT can be located remotely. Although the electronics can be located remotely, they are very complicated and have to compensate for the length and types of connecting cables. This is due to the fact that the process measures the amplitude of the signal which is attenuated by distance. The sensor 100 measures frequency, which is not affected by distance, so no compensation is required.

Another disadvantage of the LVDT is what is referred to as "the stroke-to-length ratio." In order to measure a linear distance of X inches, the sensor must be 3X inches long which defines a stroke-to-length ratio of 3:1. The sensor 100 offers a more efficient 2:1 ratio. In addition, the sensor 100 can be made redundant in a simpler and more reliable manner than the LVDT. A third disadvantage of the LVDT is the large number of windings in a coil and small diameter (fragile) of the wire used. Certain embodiments of the sensor 100 use rugged large diameter wire, and much fewer turns in the coil.

Finally, the linear error (accuracy) of an LVDT rarely is less than 0.25% of full scale. The sensor 100 typically reduces the error to 0.05%. In theory, the sensor 100 can reach accuracies of parts per million but this is rarely required.

In addition to being able to operate in environments of high and low temperatures (less than about −60° C. to more than about 1,000° C.), at high radiation levels (mega rads), under high pressure, despite vibration or shock, and in the presence of caustic chemicals or steam, the sensor 100 is inherently "intrinsically safe." Intrinsically safe means that, in an explosive atmosphere, the current and voltage flowing in the sensor 100 lack sufficient energy to produce a spark under any conditions of operation. The current and voltage in the sensing coils are an order of magnitude below the threshold of producing a spark and could be reduced even further if necessary. The sensing coils can also be made smaller, allowing the sensor 100 to be used in very tight applications (i.e., applications having significant geometrical limitations).

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A sensing apparatus for use in harsh environments to measure a characteristic of an electrically conductive target, the apparatus comprising:
   a sensing element formed as a section of a coupled slow-wave structure excluding a capacitor or an oscillator and including at least two impedance conductors each curled into a helix or spiral with opposing directions of winding around a dielectric base to form a resonator, the sensing element providing as an output signal a digital frequency that depends on the value of the measured characteristic of the target;
   a target tube formed of an electrically conductive material and configured to move over the sensing element, covering and uncovering portions of the sensing element;
   an electronics module including electronic components configured to receive the output signal from the sensing element and display the characteristic of the target; and
   at least two coaxial cables each having a length and being connected directly, without an intervening oscillator, to one of the at least two impedance conductors on one end and to the electronics module on the other end, with the length of the coaxial cables separating the electronics module from the sensing element by a distance sufficient to avoid exposing the electronics module to the harsh environments.

2. The sensing apparatus according to claim 1 wherein the at least two impedance conductors are each constructed of high-temperature, flat, insulated wire.

3. The sensing apparatus according to claim 1 wherein the at least two impedance conductors are each constructed of conductive wire and the sensing element further includes ceramic tape as insulation between the at least two impedance conductors.

4. The sensing apparatus according to claim 1 wherein the at least two impedance conductors are each constructed of a metal selected from tungsten, molybdenum, or platinum.

5. The sensing apparatus according to claim 1 wherein the length of the at least two coaxial cables is at least three meters.

6. The sensing apparatus according to claim 1 wherein the length of the at least two coaxial cables is at least six meters.

7. The sensing apparatus according to claim 1 wherein the electronic components include a resonant oscillator, a frequency meter, and a microprocessor.

8. The sensing apparatus according to claim 1 wherein the apparatus is configured to make double or triple redundant measurements.

9. The sensing apparatus according to claim 8 wherein the apparatus is configured to make double redundant measurements, the dielectric base has an extension, and two additional impedance conductors are wound on the extension.

10. The sensing apparatus according to claim 9 wherein the at least two impedance conductors and the two additional impedance conductors are aligned linearly.

11. The sensing apparatus according to claim 9 wherein the at least two impedance conductors and the two additional impedance conductors are aligned concentrically.

12. The sensing apparatus according to claim 8 wherein the apparatus is configured to make triple redundant measurements, the dielectric base has an extension, a first set of two additional impedance conductors are wound on the extension, a larger diameter hollow non-conductive tube fits over the moving target tube, a second set of two additional impedance conductors are wound on the larger diameter hollow non-conductive tube, the at least two impedance conductors and the first set of two additional impedance conductors are aligned linearly, and the at least two impedance conductors and the second set of two additional impedance conductors are aligned concentrically.

13. The sensing apparatus according to claim 1 wherein the apparatus is configured to operate in a harsh environment having a temperature of at least 225° C.

14. The sensing apparatus according to claim 1 wherein the apparatus measures linear or rotary position.

15. The sensing apparatus according to claim 14 wherein the apparatus measures lengths from one millimeter up to one meter while maintaining accuracies in the micron region.

16. The sensing apparatus according to claim 14 wherein the apparatus has a stroke-to-length ratio of 2:1.

17. The sensing apparatus according to claim 14 wherein the apparatus has a linear error of less than 0.05% of full scale.

18. The sensing apparatus according to claim 1 wherein the apparatus is intrinsically safe.

19. A sensing apparatus for use in harsh environments to measure a characteristic of an electrically conductive target, the apparatus comprising:
 a sensing element formed as a section of a coupled slow-wave structure excluding a capacitor or an oscillator and including at least two impedance conductors each curled into a helix or spiral with opposing directions of winding around a dielectric base to form a resonator, the sensing element providing as an output signal a digital frequency that depends on the value of the measured characteristic of the target;
 a target tube formed of an electrically conductive material and configured to move over the sensing element, covering and uncovering portions of the sensing element;
 an electronics module including a resonant oscillator, a frequency meter, and a microprocessor configured to receive the output signal from the sensing element and display the characteristic of the target; and
 at least two coaxial cables each having a length and being connected directly, without an intervening oscillator, to one of the at least two impedance conductors on one end and to the electronics module on the other end, so that the electronics module is attached directly to the sensing element through the at least two coaxial cables, with the length of the coaxial cables separating the electronics module from the sensing element by a distance sufficient to avoid exposing the electronics module to the harsh environments,
 wherein the apparatus is intrinsically safe and is configured to operate in a harsh environment having a temperature of at least 225° C.

* * * * *